(12) United States Patent
Jones et al.

(10) Patent No.: US 10,803,668 B2
(45) Date of Patent: Oct. 13, 2020

(54) CONTROLLING PRESENTATION OF HIDDEN INFORMATION

(71) Applicant: Curious Company, LLC, Portland, OR (US)

(72) Inventors: Anthony Mark Jones, Hillsboro, OR (US); Bruce A Young, Le Mars, IA (US)

(*) Notice: Subject to any disclaimer, the term of this patent is extended or adjusted under 35 U.S.C. 154(b) by 0 days.

(21) Appl. No.: 16/135,198

(22) Filed: Sep. 19, 2018

(65) Prior Publication Data

US 2020/0082629 A1 Mar. 12, 2020

Related U.S. Application Data

(63) Continuation of application No. 16/123,543, filed on Sep. 6, 2018.

(51) Int. Cl.
*G06T 19/00* (2011.01)
*G06T 7/70* (2017.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC .. G06K 9/00664–00704; G06F 3/0481; G06F 3/04817; G06F 9/4443;
(Continued)

(56) References Cited

U.S. PATENT DOCUMENTS

| | | |
|---|---|---|
| 3,861,350 A | 1/1975 | Selleck |
| 5,309,169 A | 5/1994 | Lippert |

(Continued)

FOREIGN PATENT DOCUMENTS

| | | |
|---|---|---|
| CN | 103697900 A | 4/2014 |
| CN | 105781618 A | 7/2016 |

(Continued)

OTHER PUBLICATIONS

Bjerregaard, Lindsay, Consilio3D Technologies Creates New Augmented Reality Inspection Product, Retrieved from http://www.mro-network.com/software/consilio3d-technologies-creates-new-augmented-reality-inspection-product on Jun. 20, 2018.
(Continued)

*Primary Examiner* — Todd Buttram
(74) *Attorney, Agent, or Firm* — Young's Patent Services; Bruce A Young

(57) ABSTRACT

Information obscured to a user is provided through a display of a hybrid reality system (DHR). data associated with an occluded object at least partially occluded by a real-world object at a position of the user is received and a display window is created on the DHR. A first magnification factor is obtained and a first image of at least the portion of the occluded object is rendered in the display window at the first magnification factor at a first time. A second magnification factor, different than the first magnification factor, is obtained, and a second image of at least the portion of the occluded object is rendered in the display window at the second magnification factor at a second time after the first time.

20 Claims, 19 Drawing Sheets

(51) Int. Cl.
*G02B 27/01* (2006.01)
*G06F 3/01* (2006.01)
*G06T 7/73* (2017.01)
*G06T 15/20* (2011.01)
*G06T 15/30* (2011.01)
*G06T 19/20* (2011.01)

(52) U.S. Cl.
CPC ............... *G06T 7/70* (2017.01); *G06T 7/73* (2017.01); *G06T 15/20* (2013.01); *G02B 2027/0138* (2013.01); *G06F 3/017* (2013.01); *G06T 15/30* (2013.01); *G06T 19/20* (2013.01); *G06T 2200/24* (2013.01); *G06T 2219/2016* (2013.01)

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | |
|---|---|---|
| 5,815,411 A | 9/1998 | Ellenby et al. |
| 8,520,900 B2 | 8/2013 | Rhoads et al. |
| 8,863,039 B2* | 10/2014 | Lim .................... G06F 3/04883 715/788 |
| 8,953,841 B1 | 2/2015 | Leblang et al. |
| 9,165,381 B2 | 10/2015 | Latta et al. |
| 9,229,231 B2 | 1/2016 | Small et al. |
| 9,292,096 B2 | 3/2016 | Watanabe et al. |
| 9,852,599 B1 | 12/2017 | Slavin et al. |
| 9,911,020 B1 | 3/2018 | Liu et al. |
| 9,928,662 B2 | 3/2018 | Palmaro |
| 9,953,216 B2 | 4/2018 | Alvarez |
| 9,978,180 B2 | 5/2018 | Margolis et al. |
| 10,065,074 B1* | 9/2018 | Hoang .................... G16H 40/63 |
| 10,134,192 B2 | 11/2018 | Tomlin et al. |
| 10,203,762 B2 | 2/2019 | Bradski et al. |
| 10,430,985 B2 | 10/2019 | Harrises et al. |
| 10,497,161 B1 | 12/2019 | Jones et al. |
| 10,528,228 B2 | 1/2020 | Seixeiro et al. |
| 10,636,197 B2 | 4/2020 | Jones |
| 10,636,216 B2 | 4/2020 | Jones et al. |
| 10,650,600 B2 | 5/2020 | Jones et al. |
| 10,706,629 B2 | 7/2020 | Boyapalle et al. |
| 2002/0191004 A1 | 12/2002 | Ebersole |
| 2002/0196202 A1 | 12/2002 | Bastian et al. |
| 2003/0025714 A1 | 2/2003 | Ebersole et al. |
| 2003/0210812 A1 | 11/2003 | Khamene et al. |
| 2005/0041424 A1 | 2/2005 | Ducharme |
| 2007/0045641 A1 | 3/2007 | Chua et al. |
| 2008/0267490 A1* | 10/2008 | Gorges .................... G06T 15/503 382/154 |
| 2008/0300854 A1 | 12/2008 | Eibye |
| 2009/0065715 A1 | 3/2009 | Wainright |
| 2009/0091237 A1 | 4/2009 | Hirosaki et al. |
| 2009/0109244 A1* | 4/2009 | Conner .................... G09G 5/14 345/660 |
| 2009/0240431 A1 | 9/2009 | Chau et al. |
| 2009/0251537 A1* | 10/2009 | Keidar ............ G08B 13/19645 348/143 |
| 2010/0117828 A1 | 5/2010 | Goldman et al. |
| 2010/0302015 A1 | 12/2010 | Kipman et al. |
| 2011/0270135 A1 | 11/2011 | Dooley et al. |
| 2012/0087104 A1 | 4/2012 | Dai et al. |
| 2012/0105473 A1* | 5/2012 | Bar-Zeev .................... G02B 27/017 345/633 |
| 2012/0289290 A1* | 11/2012 | Chae .................... G06F 3/0488 455/566 |
| 2013/0073637 A1* | 3/2013 | Kim .................... G06F 9/54 709/206 |
| 2013/0222371 A1 | 8/2013 | Reitan |
| 2013/0249947 A1 | 9/2013 | Reitan |
| 2013/0249948 A1 | 9/2013 | Reitan |
| 2013/0342564 A1 | 12/2013 | Kinnebrew et al. |
| 2014/0002444 A1 | 1/2014 | Bennett et al. |
| 2014/0306891 A1 | 10/2014 | Latta et al. |
| 2015/0109193 A1 | 4/2015 | Sly et al. |
| 2015/0130790 A1* | 5/2015 | Vasquez, II ........... G06T 19/006 345/419 |
| 2015/0243079 A1 | 8/2015 | Cho et al. |
| 2015/0263806 A1 | 9/2015 | Puscasu et al. |
| 2015/0278604 A1 | 10/2015 | Shuster et al. |
| 2015/0293592 A1 | 10/2015 | Cheong et al. |
| 2015/0325047 A1 | 11/2015 | Conner et al. |
| 2016/0003737 A1 | 1/2016 | Shimada |
| 2016/0026253 A1 | 1/2016 | Bradski et al. |
| 2016/0029143 A1 | 1/2016 | Johnson et al. |
| 2016/0147408 A1* | 5/2016 | Bevis .................... G06F 3/04815 715/850 |
| 2016/0187974 A1 | 6/2016 | Mallinson |
| 2016/0248506 A1 | 8/2016 | Ryan et al. |
| 2016/0270656 A1* | 9/2016 | Samec .................... A61B 3/085 |
| 2016/0342388 A1 | 11/2016 | Imamura et al. |
| 2017/0005826 A1 | 1/2017 | Youn |
| 2017/0026560 A1 | 1/2017 | Whitehouse et al. |
| 2017/0061696 A1 | 3/2017 | Li et al. |
| 2017/0091998 A1 | 3/2017 | Piccolo |
| 2017/0103440 A1 | 4/2017 | Xing et al. |
| 2017/0117823 A1 | 4/2017 | Arnaud et al. |
| 2017/0169170 A1 | 6/2017 | Otin |
| 2017/0173457 A1 | 6/2017 | Rihn |
| 2017/0192091 A1 | 7/2017 | Felix |
| 2017/0193705 A1 | 7/2017 | Mullins et al. |
| 2017/0269712 A1* | 9/2017 | Forsblom ............... G06F 3/0346 |
| 2017/0277166 A1 | 9/2017 | Popa-Simil et al. |
| 2017/0277257 A1 | 9/2017 | Ota et al. |
| 2017/0301107 A1 | 10/2017 | Sasaki |
| 2017/0330042 A1 | 11/2017 | Vaziri |
| 2017/0330376 A1* | 11/2017 | Haseltine ........... G02B 27/2228 |
| 2017/0341576 A1 | 11/2017 | Lei et al. |
| 2017/0354878 A1 | 12/2017 | Posin |
| 2017/0374486 A1 | 12/2017 | Killham et al. |
| 2018/0011676 A1 | 1/2018 | Han et al. |
| 2018/0029641 A1 | 2/2018 | Solar et al. |
| 2018/0050267 A1 | 2/2018 | Jones |
| 2018/0053394 A1 | 2/2018 | Gersten |
| 2018/0074599 A1 | 3/2018 | Garcia et al. |
| 2018/0107277 A1 | 4/2018 | Keller et al. |
| 2018/0120936 A1 | 5/2018 | Keller et al. |
| 2018/0239144 A1 | 8/2018 | Woods et al. |
| 2018/0239417 A1 | 8/2018 | Fu et al. |
| 2018/0246698 A1 | 8/2018 | Huang |
| 2018/0261012 A1 | 9/2018 | Mullins et al. |
| 2018/0262270 A1 | 9/2018 | Maricic et al. |
| 2018/0299272 A1 | 10/2018 | Salowitz |
| 2018/0299543 A1 | 10/2018 | Lomnitz et al. |
| 2018/0303190 A1 | 10/2018 | Calilung et al. |
| 2018/0307310 A1* | 10/2018 | McCombe ........... H04N 13/239 |
| 2018/0350221 A1 | 12/2018 | Chabra et al. |
| 2019/0007548 A1 | 1/2019 | Sit et al. |
| 2019/0011703 A1 | 1/2019 | Robaina et al. |
| 2019/0026592 A1* | 1/2019 | Wang .................... G06K 9/6201 |
| 2019/0101978 A1 | 4/2019 | Iseringhausen et al. |
| 2019/0113207 A1 | 4/2019 | Palmer et al. |
| 2019/0114921 A1 | 4/2019 | Cazzoli |
| 2019/0116448 A1 | 4/2019 | Schmidt et al. |
| 2019/0132815 A1 | 5/2019 | Zampini et al. |
| 2019/0196578 A1 | 6/2019 | Iodice et al. |
| 2019/0199136 A1 | 6/2019 | Choi et al. |
| 2019/0271755 A1 | 9/2019 | Peitz et al. |
| 2019/0373395 A1 | 12/2019 | Sarkar |
| 2019/0377538 A1 | 12/2019 | Jones et al. |
| 2019/0385370 A1 | 12/2019 | Boyapalle et al. |
| 2020/0020145 A1 | 1/2020 | Jones et al. |
| 2020/0020161 A1 | 1/2020 | Jones et al. |
| 2020/0020162 A1 | 1/2020 | Jones et al. |
| 2020/0082600 A1 | 3/2020 | Jones et al. |

(56) References Cited

U.S. PATENT DOCUMENTS

| | | | |
|---|---|---|---|
| 2020/0082601 | A1 | 3/2020 | Jones et al. |
| 2020/0082602 | A1 | 3/2020 | Jones |
| 2020/0082628 | A1 | 3/2020 | Jones et al. |
| 2020/0150751 | A1 | 5/2020 | Laaksonen et al. |
| 2020/0018363 | A1 | 6/2020 | Boyapalle et al. |
| 2020/0183171 | A1 | 6/2020 | Robaina et al. |

FOREIGN PATENT DOCUMENTS

| | | |
|---|---|---|
| CN | 107657662 A | 2/2018 |
| WO | 2003060830 A1 | 7/2003 |
| WO | 2017151778 A1 | 9/2017 |

OTHER PUBLICATIONS

DAQRI, Smart Glasses Specifications Sheet, Mar. 15, 2018, Retrieved from https://assets.daqri.com/documents/DAQRI_Smart_Glasses_Datasheet_2018.pdf on Aug. 22, 2019.

DAQRI, Smart Glasses, Retrieved from https://www.daqri.com/products/smart-glasses/ on Jun. 20, 2018.

Epson, Moverio Pro BT-200/BT-300 Smart Headset, Retrieved from https://epson.com/For-Work/Wearables/Smart-Glasses/Moverio-Pro-BT-2000-Smart-Headset-/p/V11H725020 on Jun. 20, 2018.

Farsens, EPC C1G2 Batteryless Ambient Temperature and Barometric Pressure Sensor, Jan. 2018, retrieved from http://www.farsens.com/wp-content/uploads/2018/01/DS-EVAL01-FENIX-VORTEX-RM-V03.pdf on Nov. 30, 2018.

Farsnes, EPC C1G2 Batteryless LED Indicator, Jan. 2018, retrieved from http://www.farsens.com/wp-content/uploads/2018/01/DS-EVAL01-STELLA-R-V03.pdf on Nov. 30, 2018.

LASTER Technologies, LASTER SeeThru: The First Genuine Augmented Reality Wireless Eyewear Launches on Kickstarter, Retrieved from https://www.businesswire.com/news/home/20140115005387/en/LASTER-SeeThru-Genuine-Augmented-Reality-Wireless-Eyewear on Jun. 20, 2018.

Microsoft, Hololens Overview, Retrieved from https://www.microsoft.com/en-us/hololens/commercial-overview on Jun. 20, 2018.

Microsoft, Why Hololens, Retrieved from https://www.microsoft.com/en-us/hololens/why-hololens on Jun. 20, 2018.

Occulus, Rift VR Headset, Retrieved from https://www.oculus.com/rift/?utm_campaign=%5bcampaign%5d&utm_source=google&utm_medium=cpc&gclid=Cj0KCQiAzrTUBRCnARIsAL0mqcyb5MhpYgdQ1fl2hb0CxWcIg32N-e8B4Vv-zBcirW136-5JU3PAQaEaAkLaEALw_wcB&gclsrc=aw.ds on Jun. 20, 2018.

Osterhout Design Group, Smartglasses 7, Retrieved from http://www.osterhoutgroup.com/downloads/pdf/product/R-7HL-TechSheet.pdf on Jun. 20, 2018.

Phillips, Jon, Hands on with Laster SeeThru, a direct augmented-reality challenge to Google Glass, Retrieved from https://www.pcworld.com/article/2105865/hands-on-with-laster-seethru-a-direct-augmented-reality-challenge-to-google-glass.html on Jun. 22, 2018.

Polap, David, et al. "Obstacle Detection as a Safety Alert in Augmented Reality Models by the Use of Deep Learning Techniques." Sensors (Basel) (2017). Retrieved from https://www.ncbi.nlm.nih.gov/pmc/articles/PMC5751448/ on Jun 20, 2018.

Singularity Hub Staff, This Augmented Reality Helmet Helps Firefighters See Through Smoke to Save Lives, Retrieved from https://singularityhub.com/2017/06/28/this-augmented-reality-helmet-helps-firefighters-see-through-smoke-to-save-lives/#sm.00013g1l63cseeyjw2l1fob4gx02f on Jun. 20, 2018.

Upskill, Comm industrial equipment manufacturing use cases, Retrieved from https://upskill.io/skylight/industries/industrial-equipment/ on Jun. 20, 2018.

Upskill, Getting the Torque Just Right with Skylight Could Save Millions, Retrieved from https://upskill.io/landing/ge-aviation-case-study/ on Jun. 20, 2018.

USPTO, Final Office Action in U.S. Appl. No. 16/007,204, dated May 17, 2019.

USPTO, Non-Final Office Action in U.S. Appl. No. 16/007,204, dated Dec. 10, 2018.

Vive, HTC Vive Pro, Retrieved from https://www.vive.com/us/vive-pro-vr/?gclid=CjwKCAjwlcXXBRBhEiwApfHGTZTvHInsmDrpO7DC7pDJaBzIpsbG7a-U2iWrGgBpoiwc07DoRYThaxoCLVMQAvD_BwE on Jun. 20, 2018.

Xiang et al., Object Detection by 3D Aspectlets and Occlusion Reasoning, 4th International IEEE Workshop on 3D Representation and Recognition (3dRR), 2013.

Young, Bruce, Response to Final Office Action in U.S. Appl. No. 16/007,204, dated Jul. 17, 2019.

Young, Bruce, Response to Non-Final Office Action in U.S. Appl. No. 16/007,204, dated Mar. 11, 2019.

USPTO, Non-Final Office Action in U.S. Appl. No. 16/135,214, dated Dec. 19, 2019.

Young, Bruce, Response to non-Final Office Action in U.S. Appl. No. 16/007,335, dated Jan. 2, 2020.

Young, Bruce, Response to non-Final Office Action in U.S. Appl. No. 16/031,772, dated Dec. 18, 2019.

Young, Bruce, Response to non-Final Office Action in U.S. Appl. No. 16/0331,797, dated Jan. 6, 2020.

Young, Bruce, Response to non-Final Office Action in U.S. Appl. No. 16/123,543, dated Jan. 3, 2020.

Young, Bruce, Response to non-Final Office Action in U.S. Appl. No. 16/135,119, dated Jan. 6, 2020.

Young, Bruce, Response to non-Final Office Action in U.S. Appl. No. 16/135,175, dated Jan. 6, 2020.

Young, Bruce, Response to non-Final Office Action in U.S. Appl. No. 16/135,214, dated Jan. 9, 2020.

Polap, Dawid, et al., Obstacle Detection as a Safety Alert in Augmented Reality Models by the Use of Deep Learning Techniques, Sensors (Basil), Dec. 4, 2017.

USPTO, Non-Final Office Action in U.S. Appl. No. 16/135,175, dated Oct. 23, 2019.

USPTO, Non-Final Office Action in U.S. Appl. No. 16/007,335, dated Sep. 6, 2019.

USPTO, Non-Final Office Action in U.S. Appl. No. 16/031,797, dated Oct. 9, 2019.

USPTO, Non-Final Office Action in U.S. Appl. No. 16/0311,772, dated Oct. 1, 2019.

USPTO, Non-Final Office Action in U.S. Appl. No. 16/123,543, dated Oct. 9, 2019.

USPTO, Non-Final Office Action in U.S. Appl. No. 16/135,119, dated Oct. 17, 2019.

USPTO, Notice of Allowance for U.S. Appl. No. 16/0007,204, dated Sep. 6, 2018.

Fink, AR Gesture Control Arrives, Consumer Tech, Sep. 8, 2017, pp. 1-5.

Kilkmeier, et al., With a Little Help from a Holographic Friend: The OpenIMPRESS Mixed Reality Telepresence Toolkit for Remote Collaboration Systems, Proceedings of the 24th ACM Symposium on Virtual Reality Software and Technology, Nov. 28, 2018, pp. 1-11.

Kim, et al., Real-Time Human Pose Estimation and Gesture Recognition from Depth Images Using Superpixels and SVM Classifier, Sensors, Jun. 2015, (6):12410-27.

Le Chenechal, et al. Vishnu: Virtual Immersive Support for HelpiNg Users, 2016 IEEE Third VR International Workshop on Collaborative Virtual Environments (3DCVE), Mar. 20, 2016 (p. 9-12) IEEE.

Palladino, Disney Research Creates Avatars That Can Strike a Pose to Match a Person's Movements in Augmented Reality, Jul. 23, 2018 https://next.reality.news/news/disney-research-creates-avatars-can-strike-pose-match-persons-movements-augmented-reality-0186149/.

Pandey, et al., Real-Time Egocentric Gesture Recognition on Mobile Head Mounted Displays, arXiv preprint arXiv:1712:04961, Dec. 13, 2017.

Piumsomboon, et al., Exploring Enhancements for Remote Mixed Reality Collaboration, Siggragh Asia 2017 Mobile Graphics & Interactive Applications, 22/27/2017, pp. 1-5.

Piumsomboon, et al., Mini-Me An Adaptive Avatar for Mixed Reality Remote Collaboration, CHI 2018, Feb. 21, 2018.

(56) References Cited

OTHER PUBLICATIONS

USPTO, Final Office Action in U.S. Appl. No. 16/135,175, dated Jan. 27, 2019.
USPTO, Final Office Action in U.S. Appl. No. 16/007,335, dated Apr. 28, 2020.
USPTO, Final Office Action in U.S. Appl. No. 16/0311,772, dated Feb. 3, 2020.
USPTO, Final Office Action in U.S. Appl. No. 16/123,543, dated Jan. 16, 2020.
USPTO, Final Office Action in U.S. Appl. No. 16/135,119, dated Jan. 24, 2020.
USPTO, Non-Final Office Action in U.S. Appl. No. 116/358,482, dated Apr. 9, 2020.
USPTO, Non-Final Office Action in U.S. Appl. No. 16/230,278, dated Feb. 21, 2020.
USPTO, Non-Final Office Action in U.S. Appl. No. 16/353,495, dated Apr. 9, 2020.
USPTO, Non-Final Office Action in U.S. Appl. No. 16/353,847, dated Feb. 7, 2020.
USPTO, Non-Final Office Action in U.S. Appl. No. 16/208,799, dated Feb. 26, 2020.
USPTO, Non-Final Office Action in U.S. Appl. No. 16/211,061, dated Feb. 27, 2020.
USPTO, Non-Final Office Action in U.S. Appl. No. 16/353,885, dated Mar. 18, 2020.
USPTO, Notice of Allowance in U.S. Appl. No. 16/031,797, dated Feb. 21, 2020.
USPTO, Notice of Allowance in U.S. Appl. No. 16/135,119, dated Feb. 10, 2020.
USPTO, Notice of Allowance in U.S. Appl. No. 16/135,214, dated Feb. 7, 2020.
Young, Bruce, Response to Final Office Action in U.S. Appl. No. 16/123,543 dated May 18, 2020.
Young, Bruce, Response to Final Office Action in U.S. Appl. No. 16/135,119, dated Jan. 31, 2020.
Young, Bruce, Response to Non-Final Office Action in U.S. Appl. No. 15/353,847, dated May 7, 2020.
Young, Bruce, Response to Non-Final Office Action in U.S. Appl. No. 16/208,799, dated May 26, 2020.
USPTO, Non-Final Office Action in Related Matter U.S. Appl. No. 16/123,543, dated Jun. 2, 2020.
Young, Bruce, Response to Final Office Action in Related Matter U.S. Appl. No. 16/031,772, dated Jun. 1, 2020.
YouTube Video, How to Convert a selection into a layer mask in Photoshop CS6 | lynda.com, played from https://www.youtube.com/watch?v=3F4XUS45MUk on Jun. 2, 2020, Uploaded to YouTube on Jun. 15, 2015, Transcript and Screenshots submitted.
Elliott LR, Hill SG, Barnes M. Gesture-based controls for robots: oven/iew and implications for use by Soldiers. US Army Research Laboratory Aberdeen Proving Ground United States; Jul. 1, 2016.
Hardesty, Larry, MIT News, Guiding robot planes with hand gestures, Mar. 14, 2012, Retrieved from http://news.mit.edu/2012/robots-hand-gestures-0314 on Jul. 21, 2020.
USPTO, Final Office Action in Related Matter U.S. Appl. No. 16/208,799, dated Jul. 14, 2020.
USPTO, Final Office Action in Related Matter U.S. Appl. No. 16/211,061, dated Jul. 23, 2020.
USPTO, Notice of Allowance in Related Matter U.S. Appl. No. 16/135,198, dated Jun. 5, 2020.
USPTO, Notice of Allowance in Related Matter U.S. Appl. No. 16/0311,772, dated Jun. 24, 2020.
Young, Bruce, Response to Final Office Action in Related Matter U.S. Appl. No. 16/007,335, dated Jul. 28, 2020.
Young, Bruce, Response to Final Office Action in Related Matter U.S. Appl. No. 16/211,061, dated Jun. 26, 2020.
Young, Bruce, Response to non-Final Office Action in Related Matter U.S. Appl. No. 16/123,543, dated Jul. 25, 2020.
Young, Bruce, Response to non-Final Office Action in Related Matter U.S. Appl. No. 16/135,175, dated Jun. 26, 2020.
Young, Bruce, Response to Non-Final Office Action in Related Matter U.S. Appl. No. 16/230,278 dated May 21, 2020.
Young, Bruce, Response to Non-Final Office Action in Related Matter U.S. Appl. No. 16/358,482, dated Aug. 10, 2020.
Young, Bruce, Response to Non-Final Office Action in Related Matter U.S. Appl. No. 16/358,495, dated Aug. 5, 2020.
Young, Bruce, Response to Non-Final Office Action in Related Matter 160353,885 dated Jun. 18, 2020.
Young, Bruce, Supplemental Response in Related Matter U.S. Appl. No. 16/358,495, dated Aug. 26, 2020.

\* cited by examiner

US 10,803,668 B2

CONTROLLING PRESENTATION OF HIDDEN INFORMATION

CROSS-REFERENCE TO RELATED APPLICATIONS

This application is a continuation of U.S. patent application Ser. No. 16/123,543, entitled Display of Hidden Information, filed on Sep. 6, 2018, the entire contents of which are incorporated by reference herein for any and all purposes.

BACKGROUND

Technical Field

The present subject matter relates to displaying information, and more specifically, to presenting objects and information on a computer display that are hidden or obscured in a real-world scene.

Background Art

Many situations require the presentation information to a user in a way that the user can receive the information when it is needed and ensures that the user acts accordingly. One of many different professions where this is important is for emergency responders where the ability to receive the right information at the right time can be a matter of life or death. Traditionally, emergency responders have relied on audio transmissions over a radio for a majority of their information, but that is changing with the advent of widespread wireless digital communication.

Another new technology that is making its way into the world of emergency responders is digital displays. These displays may be on a handheld device, such as a mobile phone, or on a head-mounted display (HMD), such as a virtual reality (VR) display or an augmented reality (AR) display, which may be integrated into their emergency equipment, such as their helmet. Textual information can be presented to the emergency responder through the display and the information can be updated in real-time through the digital wireless interface from a command center or other information sources.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
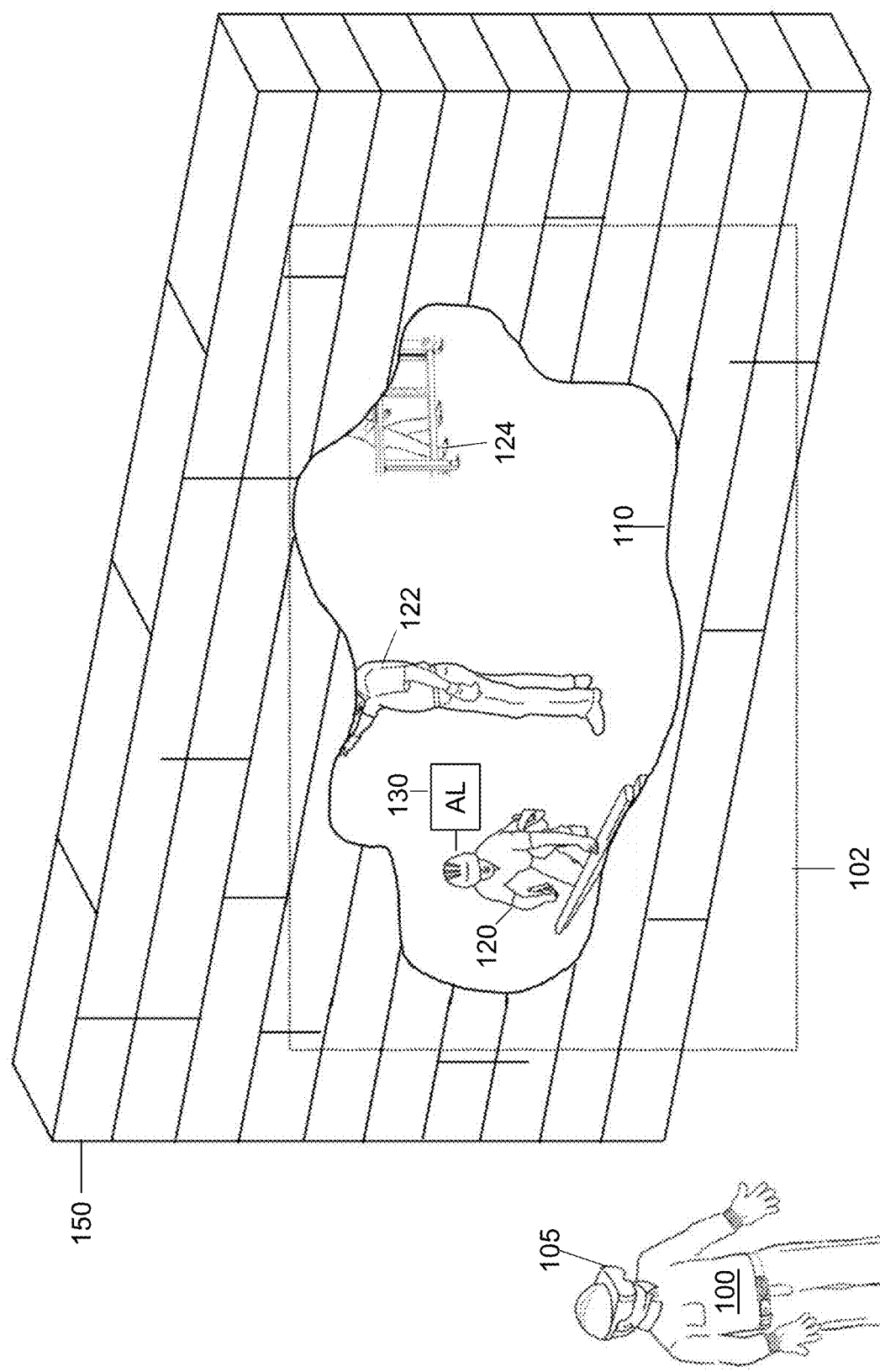
FIG. 1 shows a scene presented to a user wearing an embodiment of a head-mounted display showing personnel and objects beyond an opaque wall.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Hybrid-reality (HR), as the phrase is used herein, refers to an image that merges real-world imagery with imagery created in a computer, which is sometimes called virtual imagery. While an HR image can be a still image, it can also be a moving image, such as imagery created using a video stream. HR can be displayed by a traditional two-dimensional display device, such as a computer monitor, one or more projectors, or a smartphone screen. An HR system can be based on a device such as a microscope, binoculars, or a telescope, with virtual imagery is superimposed over the image captured by the device. In such HR systems, an eyepiece of a device may be considered the display of the system. HR imagery can also be displayed by a head-mounted display (HMD). Many different technologies can be used in an HMD to display HR imagery. A virtual reality (VR) HMD system may receive images of a real-world object, objects, or scene, and composite those images with a virtual object, objects, or scene to create an HR image. An augmented reality (AR) HMD system may present a virtual object, objects, or scene on a transparent screen which then naturally mixes the virtual imagery with a view of a scene in the real-world. A display which mixes live video with virtual objects is sometimes denoted AR, but for the purposes of this disclosure, an AR HMD includes at least a portion of the display area that is transparent to allow at least some of the user's view of the real-world to be directly viewed through the transparent portion of the AR HMD. The display used by an HR system represents a scene which is a visible portion of the whole environment. As used herein, the term "scene" and "field of view" (FOV) are used to indicate what is visible to a user.

The word "occlude" is used herein to mean that a pixel of a virtual element is mixed with an image of another object to change the way the object is perceived by a viewer. In a VR HMD, this can be done through use of a compositing process to mix the two images, a Z-buffer technique to remove elements of the image that are hidden from view, a painter's algorithm to render closer objects later in the rendering process, or any other technique that can replace a pixel of the image of the real-world object with a different pixel value generated from any blend of real-world object pixel value and an HR system determined pixel value. In an AR HMD, the virtual object occludes the real-world object if the virtual object is rendered, transparently or opaquely, in the line of sight of the user as they view the real-world object. In the following description, the terms "occlude", "transparency", "rendering" and "overlay" are used to denote the mixing or blending of new pixel values with existing object pixel values in an HR display.

In some embodiments of HR systems, there are sensors which provide the information used to render the HR imagery. A sensor may be mounted on or near the display, on the viewer's body, or be remote from the user. Remote sensors may include, but are not limited to, fixed sensors attached in an environment, sensors attached to robotic extensions, sensors attached to autonomous or semi-autonomous drones, or sensors attached to other persons. Data from the sensors may be raw or filtered. Data from the sensors may be transmitted wirelessly or using a wired connection.

Sensors used by some embodiments of HR systems include, but are not limited to, a camera that captures images in the visible spectrum, an infrared depth camera, a microphone, a sound locator, a Hall effect sensor, an air-flow meter, a fuel level sensor, an oxygen sensor, an electronic nose, a gas detector, an anemometer, a mass flow sensor, a Geiger counter, a gyroscope, an infrared temperature sensor, a flame detector, a barometer, a pressure sensor, a pyrometer, a time-of-flight camera, radar, or lidar. Sensors in some HR system embodiments that may be attached to the user include, but are not limited to, a biosensor, a biochip, a heartbeat sensor, a pedometer, a skin resistance detector, or skin temperature detector.

The display technology used by an HR system embodiment may include any method of projecting an image to an eye. Conventional technologies include, but are not limited to, cathode ray tube (CRT), liquid crystal display (LCD), light emitting diode (LED), plasma, or organic LED (OLED) screens, or projectors based on those technologies or digital micromirror devices (DMD). It is also contemplated that virtual retina displays, such as direct drawing on the eye's retina using a holographic grating, may be used. It is also contemplated that direct machine to brain interfaces may be used in the future.

The display of an HR system may also be an HMD or a separate device, such as, but not limited to, a hand-held mobile phone, a tablet, a fixed monitor or a TV screen.

The connection technology used by an HR system may include any physical link and associated protocols, such as, but not limited to, wires, transmission lines, solder bumps, near-field connections, infra-red connections, or radio frequency (RF) connections such as cellular, satellite or Wi-Fi® (a registered trademark of the Wi-Fi Alliance). Virtual connections, such as software links, may also be used to connect to external networks and/or external compute.

In many HR embodiments, aural stimuli and information may be provided by a sound system. The sound technology may include monaural, binaural, or multi-channel systems. A binaural system may include a headset or another two-speaker system but may also include systems with more than two speakers directed to the ears. The sounds may be presented as 3D audio, where each sound has a perceived position in space, achieved by using reverberation and head-related transfer functions to mimic how sounds change as they move in a particular space.

In many HR system embodiments, objects in the display may move. The movement may be due to the user moving within the environment, for example walking, crouching, turning, or tilting the head. The movement may be due to an object moving, for example a dog running away, a car coming towards the user, or a person entering the FOV. The movement may also be due to an artificial movement, for example the user moving an object on a display or changing the size of the FOV. In one embodiment, the motion may be due to the user deliberately distorting all or part of the FOV, for example adding a virtual fish-eye lens. In the following description, all motion is considered relative; any motion may be resolved to a motion from a single frame of reference, for example the user's viewpoint.

When there is motion in an HR system, the perspective of any generated object overlay may be corrected so that it changes with the shape and position of the associated real-world object. This may be done with any conventional point-of-view transformation based on the angle of the object from the viewer; note that the transformation is not limited to simple linear or rotational functions, with some embodiments using non-Abelian transformations. It is contemplated that motion effects, for example blur or deliberate edge distortion, may also be added to a generated object overlay.

In some HR embodiments, images from cameras, whether sensitive to one or more of visible, infra-red, or microwave spectra, may be processed before algorithms are executed. Algorithms used after image processing for embodiments disclosed herein may include, but are not limited to, object recognition, motion detection, camera motion and zoom detection, light detection, facial recognition, text recognition, or mapping an unknown environment. The image processing may also use conventional filtering techniques, such as, but not limited to, static, adaptive, linear, non-linear, and Kalman filters. Deep-learning neural networks may be trained in some embodiments to mimic functions which are hard to create algorithmically. Image processing may also be used to prepare the image, for example by reducing noise, restoring the image, edge enhancement, or smoothing.

In some HR embodiments, objects may be detected in the FOV of one or more cameras. Objects may be detected by using conventional algorithms, such as, but not limited to, edge detection, feature detection (for example surface patches, corners and edges), greyscale matching, gradient matching, pose consistency, or database look-up using geometric hashing. Genetic algorithms and trained neural networks using unsupervised learning techniques may also be used in embodiments to detect types of objects, for example people, dogs, or trees.

In embodiments of an HR system, object may be performed on a single frame of a video stream, although techniques using multiple frames are also envisioned. Advanced techniques, such as, but not limited to, Optical Flow, camera motion, and object motion detection may be used between frames to enhance object recognition in each frame.

After object recognition, rendering the object may be done by the HR system embodiment using databases of similar objects, the geometry of the detected object, or how the object is lit, for example specular reflections or bumps.

In some embodiments of an HR system, the locations of objects may be generated from maps and object recognition from sensor data. Mapping data may be generated on the fly using conventional techniques, for example the Simultaneous Location and Mapping (SLAM) algorithm used to estimate locations using Bayesian methods, or extended Kalman filtering which linearizes a non-linear Kalman filter to optimally estimate the mean or covariance of a state (map), or particle filters which use Monte Carlo methods to estimate hidden states (map). The locations of objects may also be determined a priori, using techniques such as, but not limited to, reading blueprints, reading maps, receiving GPS locations, receiving relative positions to a known point (such as a cell tower, access point, or other person) determined using depth sensors, WiFi time-of-flight, or triangulation to at least three other points.

Gyroscope sensors on or near the HMD may be used in some embodiments to determine head position and to generate relative motion vectors which can be used to estimate location.

In embodiments of an HR system, sound data from one or microphones may be processed to detect specific sounds. Sounds that might be identified include, but are not limited to, human voices, glass breaking, human screams, gunshots, explosions, door slams, or a sound pattern a particular machine makes when defective. Gaussian Mixture Models and Hidden Markov Models may be used to generate statistical classifiers that are combined and looked up in a database of sound models. One advantage of using statistical classifiers is that sounds can be detected more consistently in noisy environments.

In some embodiments of an HR system, eye tracking of one or both viewer's eyes may be performed. Eye tracking may be used to measure the point of the viewer's gaze. In an HMD, the position of each eye is known, and so there is a reference frame for determining head-to-eye angles, and so the position and rotation of each eye can be used to estimate the gaze point. Eye position determination may be done using any suitable technique and/or device, including, but not limited to, devices attached to an eye, tracking the eye position using infra-red reflections, for example Purkinje images, or using the electric potential of the eye detected by electrodes placed near the eye which uses the electrical field generated by an eye independently of whether the eye is closed or not.

In some HR embodiments, input is used to control the HR system, either from the user of the HR system or from external actors. The methods of input used varies by embodiment, and each input type may control any or a subset of an HR system's function. For example, in some embodiments gestures are used as control input. A gesture may be detected by using other systems coupled to the HR system, such as, but not limited to, a camera, a stereo camera, a depth camera, a wired glove, or a controller. In some embodiments using a camera for gesture detection, the video stream is analyzed to detect the position and movement of an object, for example a hand, a finger, or a body pose. The position and motion can be used to generate a 3D or 2D path and, by using stochastic or pattern matching techniques, determine the most likely gesture used.

In another example embodiment, the user's head position and movement may be used as a gesture or direct control. The head position and movement may be determined by gyroscopes mounted into an HMD. In another example, a fixed source such as an electromagnetic beam may be affixed to a user or mounted in an HMD; coupled sensors can then track the electromagnetic beam as the user's head is moved.

In yet other example embodiments, the user may have a touch-pad or a plurality of touch sensors affixed to the body, for example built-in to a glove, a suit, or an HMD, coupled to the HR system. By touching a specific point, different input data can be generated. Note that the time of a touch or the pattern of touches may also generate different input types. In some technologies, touchless sensors using a proximity to the sensor can be used.

In some embodiments a physical input device is coupled to the HR system. The physical input device may be a mouse, a pen, a keyboard, or a wand. If a wand controller is used, the HR system tracks the position and location of the wand as well as presses of any buttons on the wand; the wand may be tracked using a camera, for example using object boundary recognition, using marker tracking where a specific shape or marker is detected in each video frame, or by wired/wireless data from the wand received by the HR system. In other example embodiments, a physical input device may be virtual, where a device is rendered on the head-mounted display and the user interacts with the virtual controller using other HR systems, such as, but not limited to, gaze direction, hand tracking, finger tracking, or gesture detection. In embodiments which use gaze direction as input, interaction with virtual menus rendered on the display may be used.

Further, in another example embodiment, a backwards-facing camera mounted in an HMD may be used to detect blinking or facial muscle movement. By tracking blink patterns or facial muscle motion, input gestures can be determined.

In some embodiments, breathing patterns may be detected using a pressure sensor mounted in a breathing system coupled to the HR system to detect changes in pressure. Breath patterns such as, but not limited to, blowing softly, exhaling hard, or inhaling suddenly may be used as input data for an HR control system.

In yet other example embodiments, sounds may be detected by one or more microphones coupled to the HR system. Specific sounds, such as, but not limited to, vocalizations (e.g. scream, shout, lip buzz, snort, whistle), stamping, or clapping, may detected using stochastic or pattern matching techniques on received audio data. In some embodiments, more than one microphone may be used to place a sound in a location, allowing the position of a sound, for example a clap, to provide additional input control data. In some embodiments, voice control using natural language is used; speech recognition techniques such as trained neural networks or hidden Markov model algorithms are used by an HR system to determine what has been said.

It is anticipated that direct neural interfaces may be used in some embodiments to control an HR system.

Any input to the HR system may be used for any purpose, depending on the embodiment. For example, sounds, eye movement and/or direction, gestures, touch inputs, other physical human input devices (e.g. a keyboard, mouse, or the like), may be used for controlling the HR system, including but not limited to controlling the size, direction, color, or other expressions of video images of virtual objects displayed in the display screen, switching on and off state of the HR system, changing the user interface and settings of the display screen, switching running applications, or selection/deselection of target objects to be virtualized.

Turning now to the current disclosure, systems that display HR imagery are becoming increasingly common and are making their way from entertainment and gaming into industrial and commercial applications. Examples of systems that may find HR imagery useful include aiding a person doing a task, for example repairing machinery, testing a system, or responding to an emergency.

Many of the same environments where HR imagery might be used also provide information to a user. This information may be associated with real objects in the environment or may be related to the environment as a whole, for example an ambient or average value. In other cases, the information to be provided to the user is unrelated to the real environment they are working in. Providing the various types of information to the user in a way that can be readily understood by the user and is not confusing, distracting or obscuring details that the user needs can be a challenge.

In an HR system which aids a person doing a task, for example repairing machinery, testing a system, performing routine maintenance, or responding to an emergency, there may be areas of the environment that cannot be seen because of a visual impairment such as a wall, an opaque cover, lack of light, or smoke.

The X-ray window is an artificial object created as an overlay on the screen used to show objects and information in the environment that cannot be seen or are obscured. The X-ray window, as the term is used herein, does not necessarily have anything to do with electromagnetic radiation in the X-ray spectrum, but simply refers to a virtual object displayed for the user which shows a representation of one or more objects that would otherwise be hidden from the view of the user. The X-ray window may cover the whole field-of-view, enhance only a portion of the field-of-view, or may be added to an object that is being displayed in a separate window on the display.

The X-ray window shows details of, and information related to, occluded or obscured objects. The details may be rendered schematically or photo-realistically, but the displayed representation adds details that would otherwise be obscured, for example internal components of a covered machine or a floor collapse just beyond the field-of-view or the position of personnel behind an opaque barrier. A visible object may be identified by user input, object recognition by a camera or other sensor, self-identification through an electronic message such as an RFID tag response or a computer network message, or any other way of identifying the object. The identity may include a model designation, a serial number, an address, or any other information that can be used to clearly identify objects hidden by the object, such as internal structure or nearby objects. The visible object may not be identified in all cases, but simply may be treated as an unidentified object occluding the view of hidden structure and details known to the HR system.

In some embodiments, the information used to render hidden structure and detail as part of the X-ray window may be obtained from schematics or blueprints, for example the internal schematics of an engine or the position of air ducts, wiring, or plumbing in a building. Additionally, in some example embodiments, the information used to render the hidden structure and detail as part of the X-ray window may be obtained by using object recognition and data from one or more sensors in the current environment, such as, but not limited to, building security cameras, sensors or cameras attached to other personnel, sensors or cameras attached to autonomous or semi-autonomous drones, or robotic extensions which may place sensors or cameras into spaces obscured by a barrier. Data from sensors may be received in real-time or near real-time (which are considered to be equivalent for the purposes of this disclosure, including the claims), or may be received in a delayed fashion. In some embodiments, the data from the sensors may be received in packets that may be buffered during transmission, so the delay in the data from the sensors may be non-uniform. Additionally, in some embodiments, the information used to render the hidden structure and detail as part of the X-ray window may be obtained from historical data, for example maps from a previous scouting mission or from video streams available before smoke obscured the view. Note that the hidden structure and detail may be computed or rendered locally or directly transmitted to a head-mounted display after being generated or rendered using remote computing resources.

In some embodiments, the hidden or obscured details may be presented as a window into a real-world object. The X-ray window may be considered fixed to the object in that the details are rendered at the correct perspective if there is movement. In some embodiments, the X-ray window may be fixed to the HMD user's perspective, so the X-ray window moves across the object if there is motion, in effect allowing internal details to be scanned. The shape and size of the X-ray window, or viewport, may be rendered in any manner, such as, but not limited to, the whole object, a rectilinear shape, an object cut-away, or an organic shape. The apparent position in 3D space of the X-ray window may be touching the object, on the object or away from the object, for example the window may be presented as a view-port on the surface of the object or presented as a window in a plane near the object. In some embodiments, the X-ray window may be rendered as a window that can be moved in a path that changes the distance to the object; as the window is moved, a magnification factor is applied to the internal details in the window.

In some embodiments, relative motion, as described herein, may be used to update the rendering of an X-ray view. For example, when a user of an HR system observes a real-world scene, relative motion may update the perspective of the rendered detail so appearing fixed in real-world space. In some embodiments, relative rotation and/or linear movement may be used as input commands to manipulate the X-ray view, for example rotating, looking behind or enlarging specific details. In one example embodiment, a "snap-shot" of the X-ray rendering may be taken to allow the user to "pull" the snapshot into a real-world space and so move around the snapshot to observe extra details hidden by the limited perspective of being inside or behind a physical barrier. Note that the snap-shot may also be rotated or magnified using other input commands to the HR system. After viewing the snapshot, it may be removed on user command—the previous X-ray view may return or finish at that time.

In example embodiments, the X-ray view may render detail that represents hidden real-world data; note that the rendering may be photo-realistic, a non-realistic representation such as a schematic rendering such a wire-model or an avatar, a two-dimensional representation of the occluded object generated from a fixed perspective, or any other type of representation of the hidden real-world data or object. In some embodiments, the real-world detail rendered by the X-ray view may also be enhanced by the addition of virtual objects, such as, but not limited to, alerts, timers, pop-up data, associated haptic stimuli, associated sounds such as pre-recorded audio clips, or directions for the user. The virtual objects may be controlled in any manner using input control as described herein.

Further, in some embodiments the X-ray view may also support further X-ray views within hidden components. For example, a machine with an opaque cover may have an internal cylinder showing points of electrical connections. The X-ray view may also allow the cylinder to support an X-ray view, where the location of internal sub-components can be shown. It is anticipated that a hierarchy of X-ray views may be constructed, with the user covering and uncovering levels of hierarchy using input commands.

In some embodiments, the X-ray view may be generated using a live camera feed, for example from cameras in the environment, cameras on a drone, or cameras on a robotic arm. Since the perspective correction of a live video stream may be too computationally complex in near real-time, only simple perspective changes may be possible.

In example embodiments, real-world objects that were previously visible may become hidden, for example inserting a hand, a tool, or a robotic extension into a hidden space through an access panel. The HR system may track the position of the inserted object and show it in correct perspective in an X-ray view. For example, the position of a gloved hand may be tracked by an HR system and the hand shown in an X-ray view so that hidden objects can more easily be manipulated. The tracking of the hidden object can be done using any suitable mechanism, including, but not limited to, location sensors on the object, geometric analysis of the position of a structure supporting the object, or external sensors that may be able to track the object.

In some embodiments, hidden objects in an X-ray view may move. The new position may be calculated by the HR system and the rendering updated. For example, personnel behind a wall may move position as determined by attached GPS locators. In another example, a ball bearing may be pushed into a race or a screw turned and the new position computed using simple Newtonian mechanics. In yet another example, the new position of objects may be computed by using view changes of a camera attached to a drone or a robotic arm—changes in camera view may be deliberate, for example using a motor to jitter the camera position.

In example embodiments, the X-ray view may be manipulated by an external actor, such as, but not limited to, commanding personnel, an expert guide, or an AI system. In some embodiments, the details shown in an X-ray view may be changed as the user performs a task, such as, but not limited to, highlighting the next object to be manipulated, adding instructions to an object, or only rendering photo-realistic details in the area to be addressed at that time.

FIG. 1 shows how one embodiment of the HR system displays an X-ray window 110 added to a real-world field-of-view 102 in a head-mounted display 105 including an opaque wall 150. The visible objects in the real world, such as the opaque wall 150, may be rendered from a model, shown as a video from a camera, or passed through a transparent portion of the head-mounted display 105, depending on the embodiment. Shown in the computer-generated X-ray window 110 are personnel 120, 122, 124 rendered at the correct location and perspective to user 100 wearing the head-mounted display 105. The X-ray window 110 may have any shape, including a rectangular shape, a shape of a regular polygon, a circle, an ellipse, an asymmetric shape, a continuous curve shape, an irregular polygonal shape, or any other shape, depending on the embodiment. In some embodiments, the X-ray window 110 may correspond to the shape of the real-world object 150. The X-ray window 110 may be positioned to act as a cut-away view of an occluded space behind the real-world object 150 or may be a separate window, depending on the embodiment. Cameras in the space behind wall 150 and/or personnel locators, for example relative positions determined by infra-red depth sensors or absolute positions from GPS, are used to determine the size and position of personnel 120, 122, 124 in the hidden space. Note that the perspective of the occluded personnel 120, 122, 124 is computed as if wall 150 was not present. The occluded personnel 120, 122, 124 may be rendered in any manner, such as, but not limited to, avatars, photos of a face attached to an avatar, or photo-realistically using 3-D models of the personnel, or by using images extracted from a camera feed. Any of the occluded personnel 120, 122, 124 may be tagged, for example using names, such as shown by text "AL" 130. X-ray window 110 may be initiated by a trigger event caused by user 100, occluded personnel 120, 122, 124, or a third party. For example, in some cases, one of occluded personnel 120, 122 and 124 may want to show the user 100 the progress of their task, and may use their work terminal to send a notice to the user 100 and initiate the X-ray window 110. Or in some embodiments, if the user 100 moves to within a predetermined threshold distance, such as 10 meters, of the wall 150, then X-ray window 110 may be automatically initiated. In some embodiments, the HR system may initiate additional functions and/or run other applications upon initiation of the X-ray window 110.

Figure 2A:
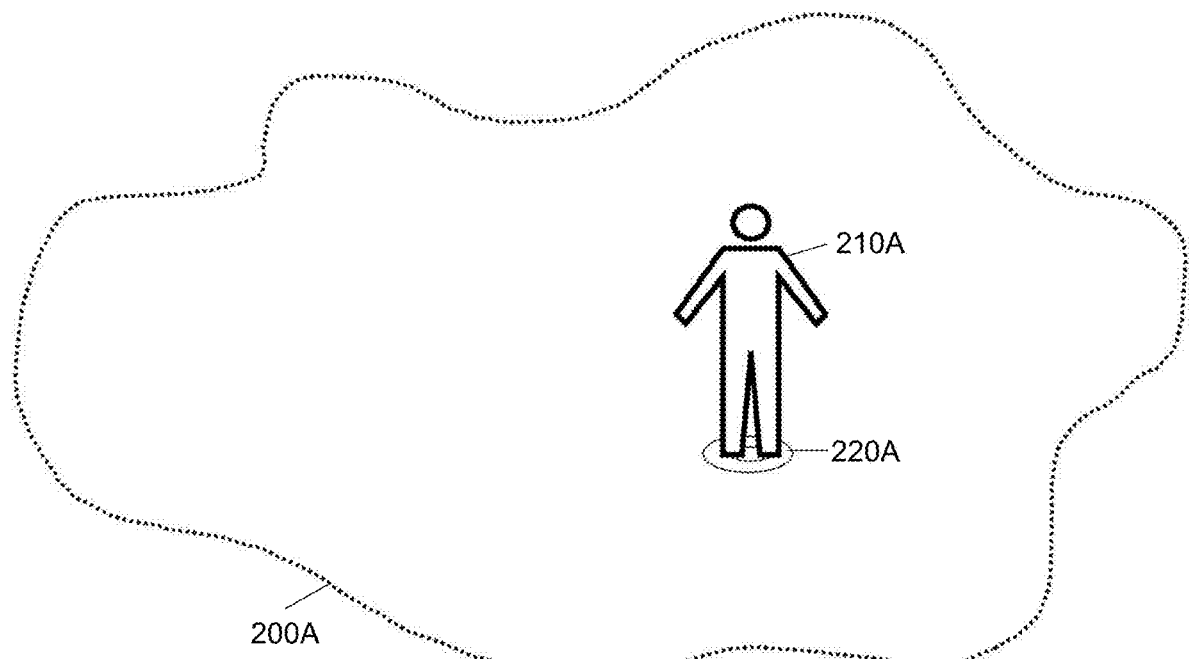
FIG. 2A/B show an avatar presented to a user wearing an embodiment of a head-mounted display with different the positional errors.

FIG. 2A shows an example embodiment of a HR system rendering an avatar 210A in an X-ray view 200A. The position, size and orientation of avatar 210A may be determined using cameras in the hidden space and/or locators attached to the person represented by avatar 210A, for example relative positions determined by infra-red depth sensors or absolute positions from GPS. X-ray view 200A also includes position error bars 220A shown as concentric circles the avatar 210A stands on. The position of the outermost error bars 220A shows the worst-case placement of the avatar.

Figure 2B:
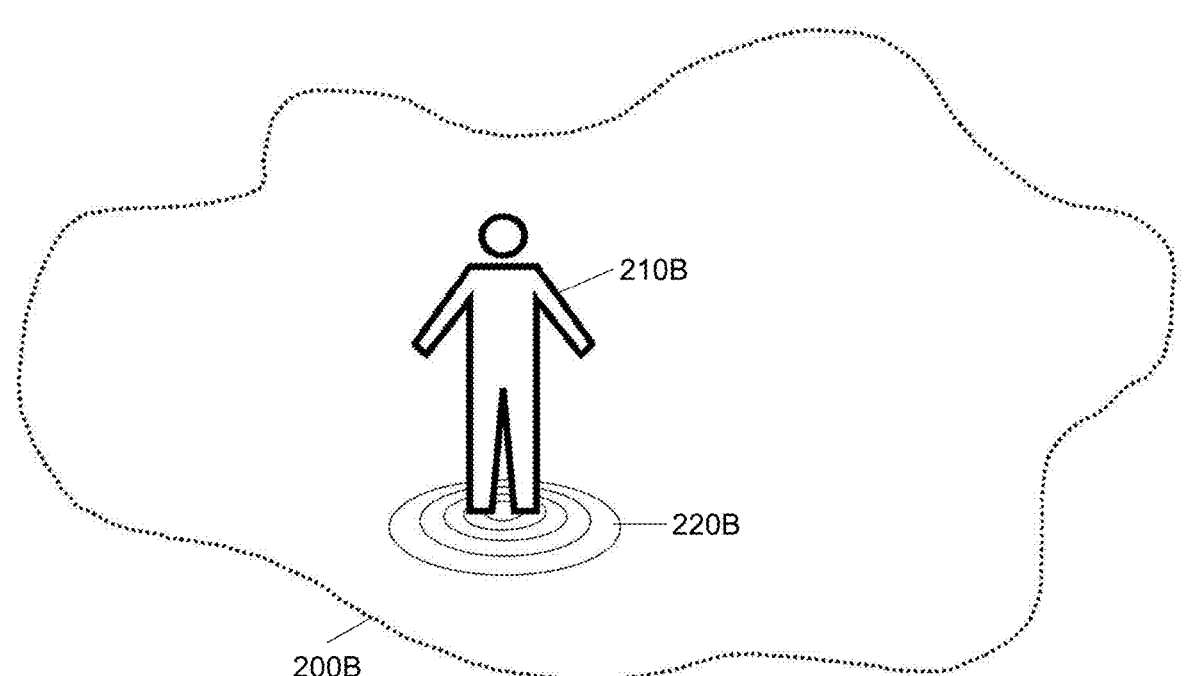

FIG. 2B shows an example embodiment of a HR system rendering an avatar 210B in an X-ray view 200B at a different time than X-ray view 200A. Similar to the vignette shown in FIG. 2A, the position, size and orientation of avatar 210B may be determined using cameras in the hidden space and/or locators attached to the person represented by avatar 210B, for example relative positions determined by infra-red depth sensors or absolute positions from GPS. Updated X-ray view 200B also includes position error bars 220B shown as concentric circles the avatar 210B stands on. The position of the outermost error bars 220B shows the worst-case placement of the avatar. Note that although avatar 220B is closer to the user at the time of FIG. 2B than FIG. 2A, the position uncertainty is greater than for FIG. 2A, as shown by the wider error bars 220B. The position uncertainty may be larger because of smoke or other environmental factors, different accuracy of sensors in different areas, an estimation rather than measurement of the position of avatar 220B, or any other factor that can affect the accuracy of the determination of the position of avatar 200B.

One display metaphor, the concentric circles, is shown in FIG. 2A/B for indicating an uncertainty in the position. Other embodiments may use other mechanisms to indicate position uncertainty to the user, including, but not limited to, using fuzzy edges on the avatar, adding a halo around the avatar, having different size platforms for an avatar, or by shaking the avatar edges by an amount in time on subsequent video frames.

Figure 3:
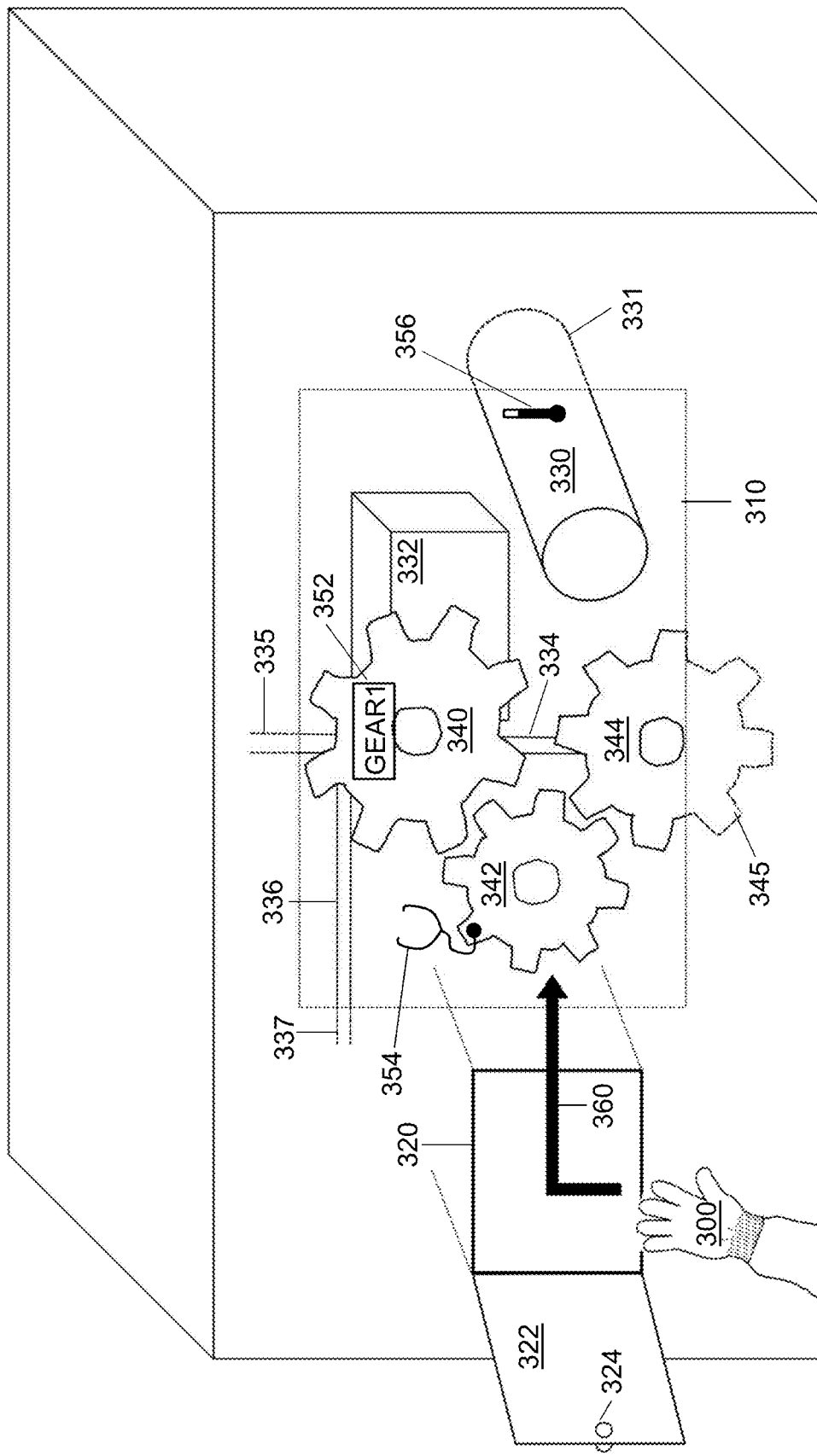
FIG. 3 shows a scene presented to a user wearing an embodiment of a head-mounted display showing internal details of a machine.

FIG. 3 shows how one embodiment of the HR system shows an X-ray window 310 added to a real-world rendering of a machine 350 enclosed by an opaque cover on each side and shown on a display of the HR system. Included on machine 350 is a physical access panel 320 opened using knob 324 on door 322. Within machine 350 are several hidden components, including cylinder 330, block 332, rod 334, rod 336, and gears 340, 342, 344. The location of components cylinder 330, block 332, rod 334, rod 336, and gears 340, 342, 344, may be obtained from schematics of machine 350 transmitted to the HR system worn by user 300 after the machine 350 is identified. Components cylinder 330, block 332, rod 334, rod 336, and gears 340, 342, 344 are within X-ray window 310 from the perspective of user 300 and so are rendered within the window 310. Note that the X-ray window 310 does not include some portions of cylinder 330, rod 334, rod 336, and gear 344. Those portions that are not in window 310 are occluded by the cover of the machine 350 and are shown by dotted line groups 331, 335, 337, 345 in FIG. 3 for clarity but are not be rendered by this embodiment of the HR system. Note that the correct positions and occluding nature of components cylinder 330, block 332, rod 334, rod 336, and gears 340, 342, 344 are rendered in window 310; for example, gear 340 occludes a portion of rods 334, 336 and block 332. Since the user can "see" inside machine 350, the user can insert their hand 300 into the access panel in direction of arrow 360 to manipulate the machine, for example oiling gears 340, 342, 344. This allows tasks to be performed inside of the machine 350 safely and with confidence. X-ray window 310 may be initiated by a trigger event, such as opening the physical access panel 320. If the X-ray window 110 is initiated automatically through other actions, such as opening the physical access panel 320, the user can naturally, and without any additional action, view inside the machine 350 through X-ray window 110. In some embodiments, the HR system may initiate additional functions and/or run other applications upon initiation of the X-ray window 310.

In some embodiments, virtual objects may be attached to the rendered occluded objects. The system may automatically attach a virtual object, and/or a user may determine which virtual object to attach to a rendered occluded object. The virtual objects can be used for any purpose but can include tags to identify an occluded object, such as the GEAR1 tag 352 attached to gear 340. The tags may provide information about the occluded object such as a name of the object, a part number for an object, procurement information for a replacement for the object, diagnostic procedures for the object, or any other type of information related to the object.

In some embodiments, the virtual objects may be attached to monitor a status of an occluded object, such as indicating that a sound made by the gear 342 should be monitored by placing a virtual stethoscope 354 on gear 342 or that a temperature of cylinder 330 should be monitored by placing a virtual thermometer 356 on cylinder 330. Data may be collected directly from the occluded object, for example from sensors monitoring the occluded object, or from an external source. Some or all of the data may be used to generate the information provided by the virtual object on the HMD based on a type of virtual object selected and/or a placement of the virtual object, such as showing a digital read-out of the temperature of the occluded object next to the virtual thermometer 356 at the location of the virtual thermometer 356, changing a fill amount, a shape or a color of the virtual object, or playing the sound made by gear 342 on an audio output device heard by the user. In some embodiments the data may be logged and stored by the HR system and/or provided to other users and/or software applications for analysis. X-ray window 310 may be initiated by a trigger event, such as receiving signals transmitted from sensors monitoring the occluded object or an external source. When receiving signals that indicate a certain parameter, such as temperature, humidity, noise, gas concentration, exceeds a predetermined threshold, the HR system may automatically, without any additional action by a user, initiate X-ray window 310. Also, when receiving such signals, the HR system may initiate a part of its functions or start to run certain types of applications thereon.

Figure 4A:
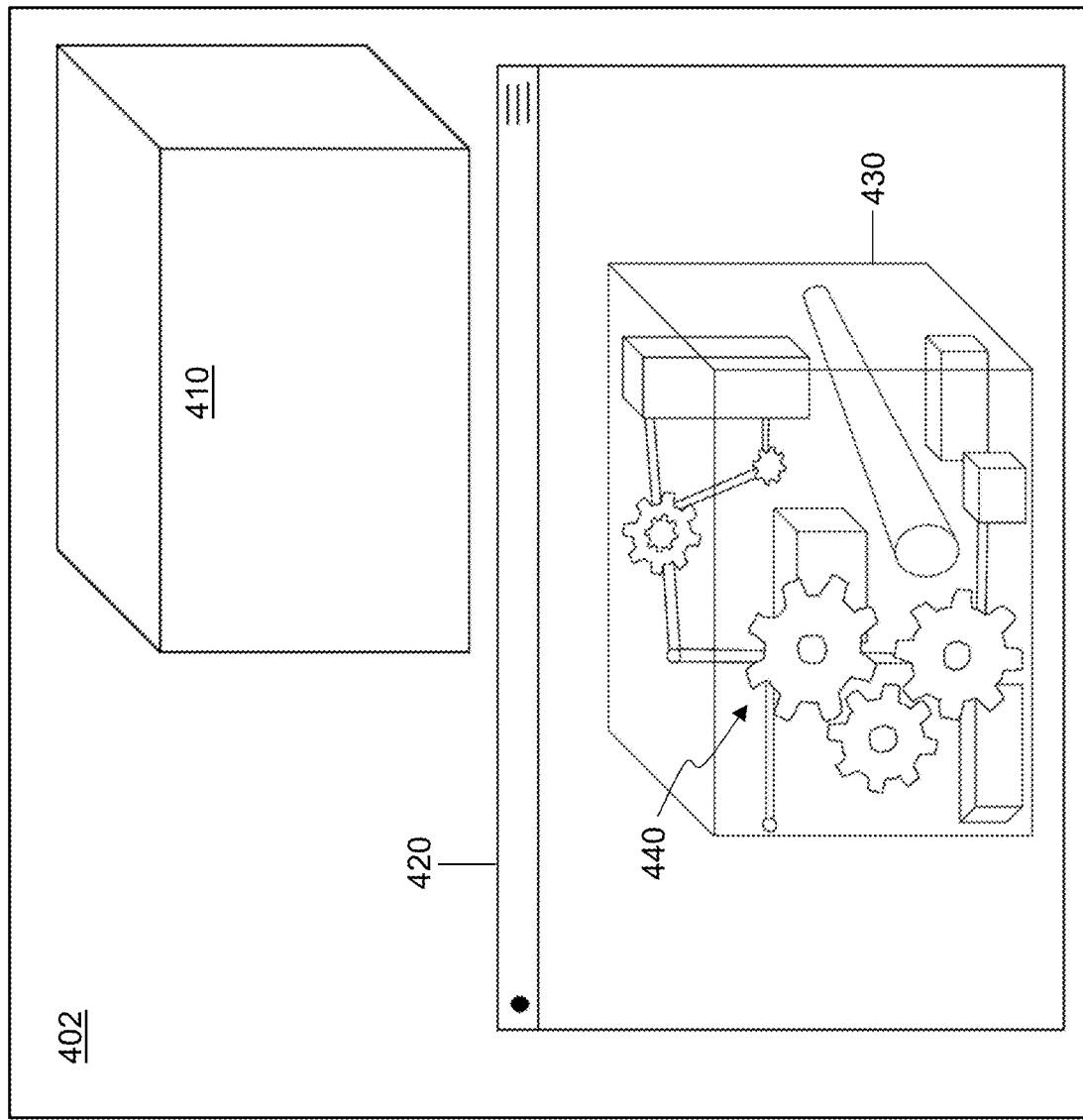
FIG. 4A shows a scene presented to a user wearing an embodiment of a head-mounted display showing internal details of a machine in a separate popup X-ray window.
Figure 4A:
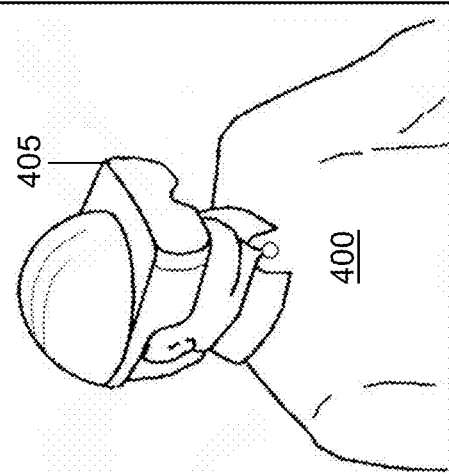

FIG. 4A shows how one embodiment of the HR system shows an X-ray window 420 added to a view 402 presented to a user 400 wearing a head-mounted display (HMD) 405. The view 402 includes a real-world machine 410 and a view of the internal components 440 of the machine 410 presented as a separate popup X-ray window 420. In popup window 420, the real-world machine 410 is shown as rendered machine 430; note that the rendered machine 430 may or may not track the position of real-world machine 410 if there is relative motion. In popup window 420, internal components 440 are rendered within machine 430 with respect to the perspective of machine 430. The presence, the relative location and size of internal components 440 may be obtained from schematics of machine 410 transmitted to the HR system worn by user 400 based, for example, on identification of the machine 410 or the location of machine 410. Since internal components 440 of machine 410 are shown, representation of machine 430 may be a simple wire-frame model in at least some embodiments. X-ray window 420 may be initiated and/or controlled by a trigger event. For example, in some cases, the HMD 405 may contain a sensor to detect a gesture by user, such as ToF (Time of Flight) sensor which detects motion of user 400. By detecting the motion of user 400, such as hand movement, X-ray window 420 may be initiated. For example, if a user 400 claps their hands, X-ray window 420 may be initiated. Also, in some cases, a user 400 may wear a glove or ring to detect hand movement. By detecting hand movement of the user 400, X-ray window 420 may be controlled in some embodiments.

Figure 4B:
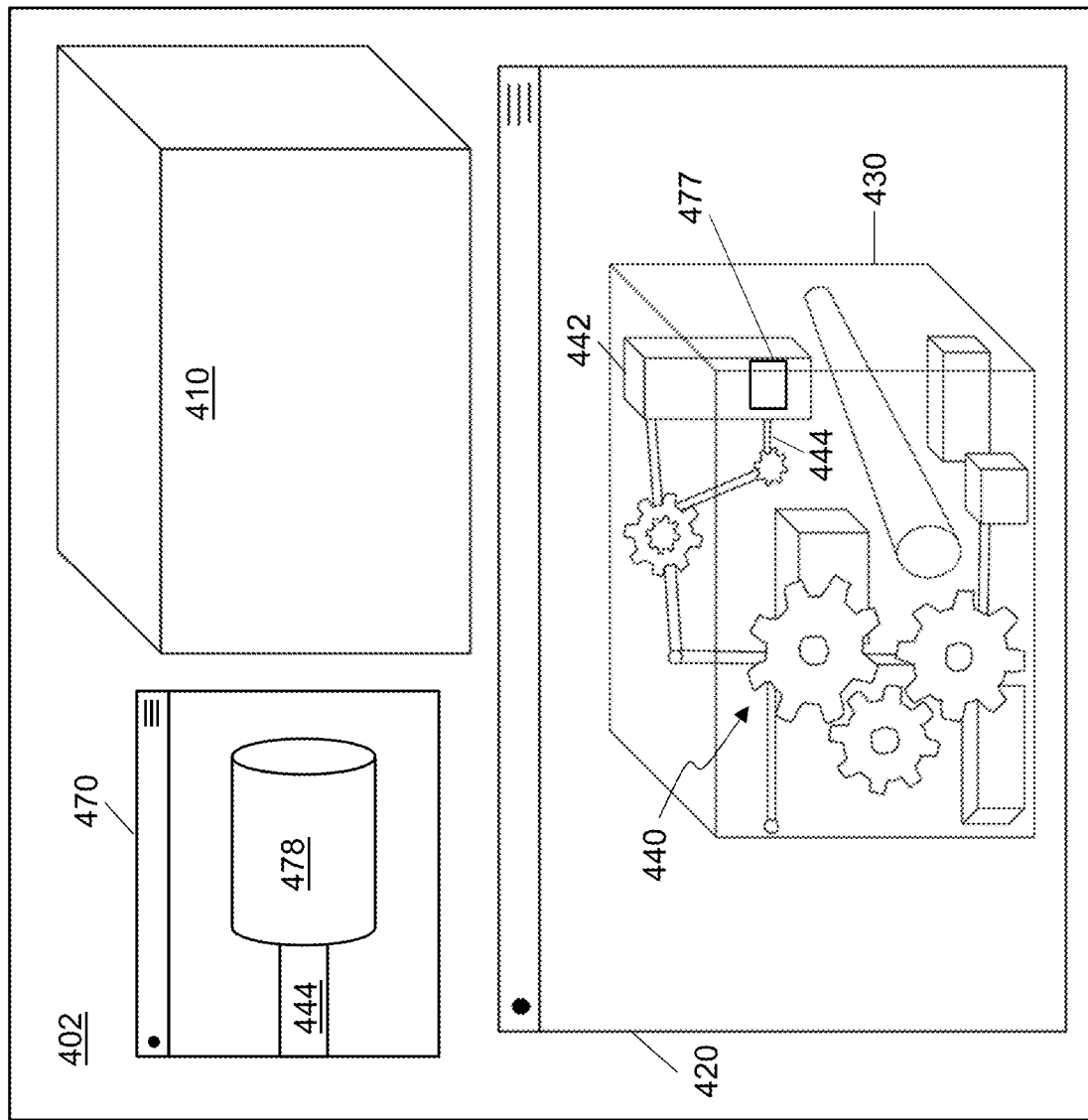
FIG. 4B shows the scene of FIG. 4A with an embodiment of hierarchical display of internal details of a machine in separate X-ray windows.

FIG. 4B shows the scene of FIG. 4A with an embodiment of a hierarchical display of internal details of a machine in separate X-ray windows. The internal components 440 of the machine 410 are shown in X-ray window 420 inside of rendered machine 430. The internal components 440 include the block 442 and the pipe 444. The user has created a virtual window 477 on the view of block 442 which created a second pop-up X-ray window 470 showing the internal components 444, 478 of block 442 which would be visible through virtual window 477. Any number of levels of hierarchy may be created in embodiments to allow occluded components to be shown no matter how many layers of structure may interfere with their visibility.

Figure 5:
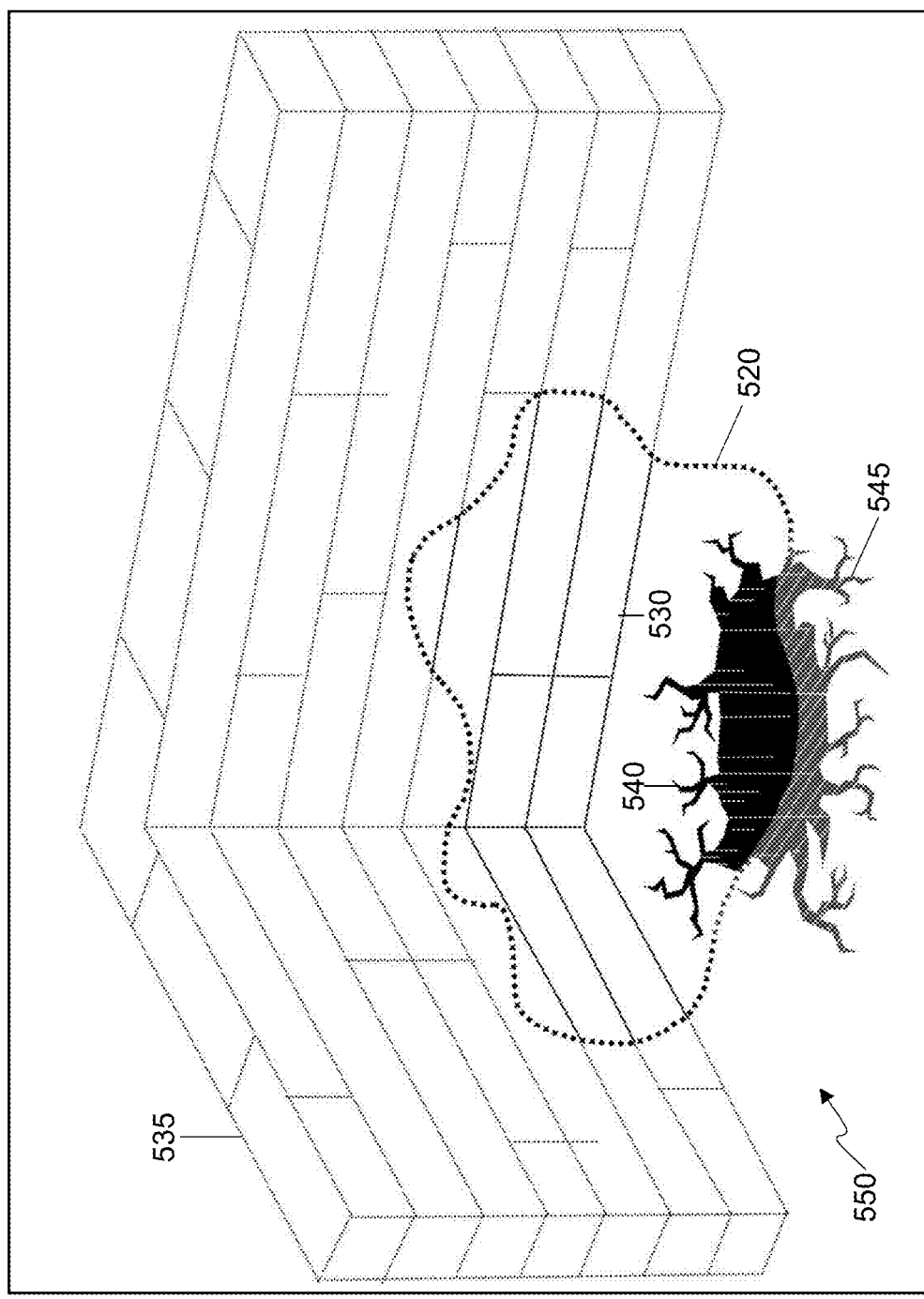
FIG. 5 shows a scene presented to a user wearing an embodiment of a head-mounted display where details obscured in the view are enhanced.

FIG. 5 shows how one embodiment of the HR system shows an X-ray window 520 added to a real-world rendered field-of-view 510 shown a display of the HR system. In field of view 510, there is a wall 530, hazard 540 and particulate matter 550 obscuring objects in the field-of-view 510, for example smoke or water droplets. The positions of the wall 530 obscured by particulate matter 550 are shown by dotted lines 535. The positions of the hazard 540 obscured by particulate matter 550 are shown by shaded area 545. Depending on environmental factors and the density of the particulate matter 550, the portions of the wall 530 and hazard 540 may be only partially visible or may not be visible in the field of view 510. Within the X-ray window 520, wall portions 530 and hazard portions 540 are shown clearly rendered by the HR system to user 500, with all other details in the field of view 510 obscured by particulate matter 550. The position and size of wall 530 and hazard 540 may be estimated from maps obtained from data provided before the particulate matter 550 was present. In other example embodiments, the position of wall 530 may be obtained from building blueprints or from personnel present at an earlier time. In other example embodiments, the position of hazard 540 may be obtained from other sensors, for example IR cameras, or from other personnel, for example people behind the wall 530 or on the floor below who have an unobscured view. X-ray window 520 may be initiated and/or controlled by a trigger event. For example, in some cases, when hazardous situation 540 is detected in the obscured area, the X-ray window 520 may be automatically initiated. The hazardous situation, such as fire, high temperature, air pollution, gas leak, or dangerous liquid leak, may be detected by a sensor located in occluded area.

Figure 6:
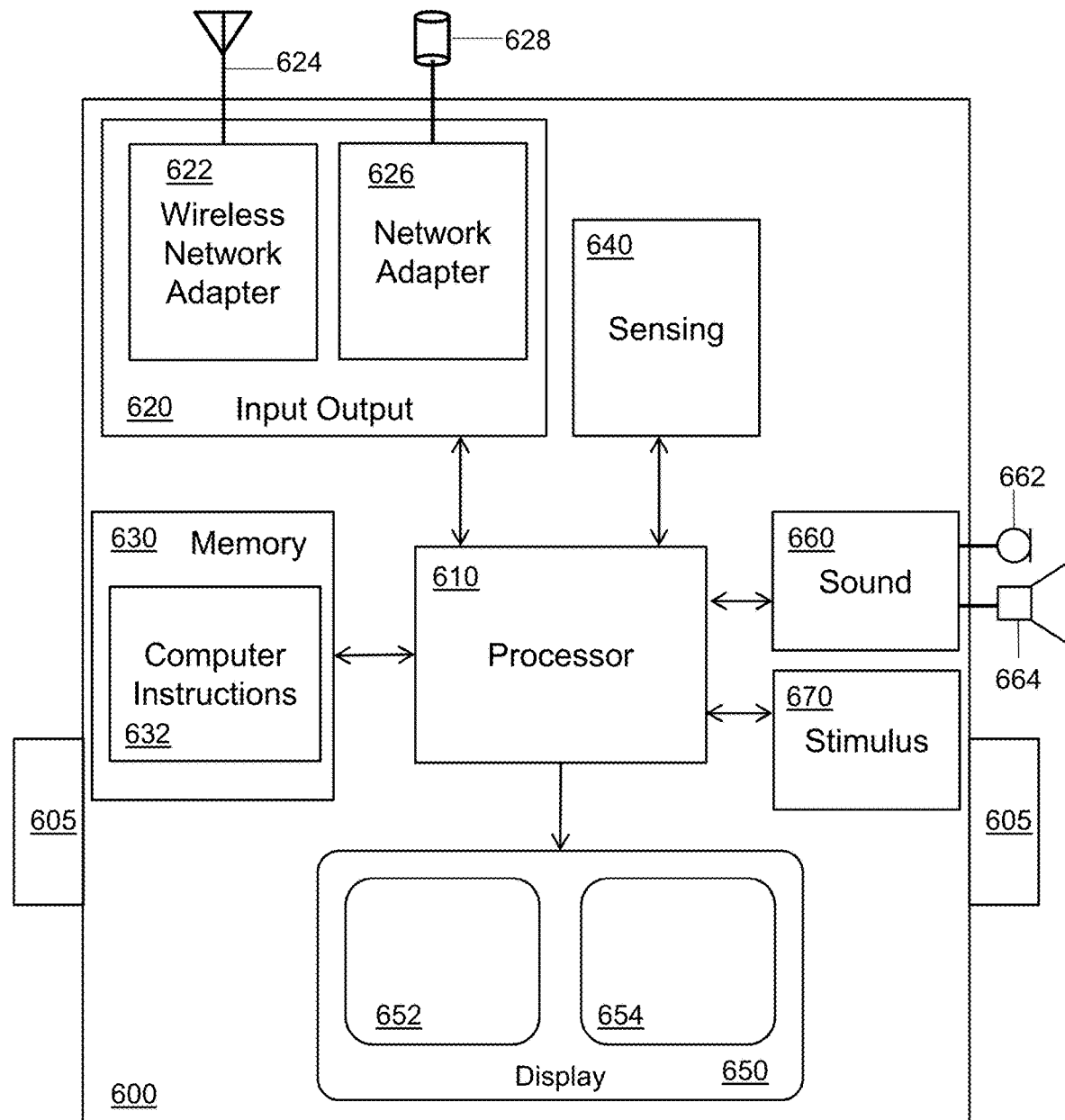
FIG. 6 shows a block diagram of an embodiment of an HR system.

FIG. 6 is a block diagram of an embodiment of an HR system 600 which may have some components implemented as part of a head-mounted assembly (HMD). The HR system 600 may be considered a computer system that can be adapted to be worn on the head, carried by hand, or otherwise attached to a user. In the embodiment of the HR system 600 shown, a structure 605 is included which is adapted to be worn on the head of a user. The structure 605 may include straps, a helmet, a hat, or any other type of mechanism to hold the HR system on the head of the user as a HMD.

The HR system 600 also includes a display 650 positioned in a field-of-view (FOV) of the user. The structure 605 may position the display 650 in the field of view of the user. In some embodiments, the display 650 may be a stereoscopic display with two separate views of the FOV, such as view 652 for the user's left eye, and view 654 for the user's right eye. The two views 652, 654 may be shown as two images on a single display device or may be shown using separate display devices that are included in the display 650. In some embodiments, the display 650 may be transparent, such as in an augmented reality (AR) HMD. In systems where the display 650 is transparent, the view of the FOV of the real-world as seen through the display 650 by the user is composited with virtual objects that are shown on the display 650. The virtual objects may occlude real objects in the FOV as overlay elements and may themselves be transparent or opaque, depending on the technology used for the display 650 and the rendering of the virtual object. A virtual object, such as an overlay element, may be positioned in a virtual space, which could be two-dimensional or three-dimensional, depending on the embodiment, to be in the same position as an associated real object in real space. Note that if the display 650 is a stereoscopic display, two different views of the overlay element may be rendered and shown in two different relative positions on the two views 652, 654, depending on the disparity as defined by the inter-ocular distance of a viewer.

In some embodiments, the HR system 600 includes one or more sensors in a sensing block 640 to sense at least a portion of the FOV of the user by gathering the appropriate information for that sensor, for example visible light from a visible light camera, from the FOV of the user. Any number of any type of sensor, including sensors described previously herein, may be included in the sensor block 640, depending on the embodiment. In some embodiments, sensor(s) in the sensing block 640 may be configured to detect a motion of the user. The motion of a hand, finger, head, eye, arm, leg, body, and/or any other body part of the user or object held or moved by the user may be detected by the sensor(s) in the sensing block 640. The processor 610 may then use the geometry, appearance, gesture and/or location of the movement to instantiate and/or control an X-ray window presented on the display 650.

The HR system 600 may also include an I/O block 620 to allow communication with external devices. The I/O block 620 may include one or both of a wireless network adapter 622 coupled to an antenna 624 and a network adapter 626 coupled to a wired connection 628. The wired connection 628 may be plugged into a portable device, for example a mobile phone, or may be a component of an umbilical system such as used in extreme environments.

In some embodiments, the HR system 600 includes a sound processor 660 which takes input from one or microphones 662. In some HR systems 600, the microphones 662 may be attached to the user. External microphones, for example attached to an autonomous drone, may send sound data samples through wireless or wired connections to I/O block 620 instead of, or in addition to, the sound data received from the microphones 662. The sound processor 660 may generate sound data which is transferred to one or more speakers 664, which are a type of sound reproduction device. The generated sound data may be analog samples or digital values. If more than one speaker 664 is used, the sound processor may generate or simulate 2D or 3D sound placement. In some HR systems 600, a first speaker may be positioned to provide sound to the left ear of the user and a second speaker may be positioned to provide sound to the right ear of the user. Together, the first speaker and the second speaker may provide binaural sound to the user.

In some embodiments, the HR system 600 includes a stimulus block 670. The stimulus block 670 is used to provide other stimuli to expand the HR system user experience. Embodiments may include numerous haptic pads attached to the user that provide a touch stimulus. Embodiments may also include other stimuli, such as, but not limited to, changing the temperature of a glove, changing the moisture level or breathability of a suit, or adding smells to a breathing system.

The HR system 600 may include a processor 610 and one or more memory devices 630, which may also be referred to as a tangible medium or a computer readable medium. The processor 610 is coupled to the display 650, the sensing block 640, the memory 630, I/O block 620, sound block 660, and stimulus block 670, and is configured to execute the instructions 632 encoded on (i.e. stored in) the memory 630. Thus, the HR system 600 may include an article of manufacture comprising a tangible medium 630, that is not a transitory propagating signal, encoding computer-readable instructions 632 that, when applied to a computer system 600, instruct the computer system 600 to perform one or more methods described herein, thereby configuring the processor 610.

While the processor 610 included in the HR system 600 may be able to perform methods described herein autonomously, in some embodiments, processing facilities outside of that provided by the processor 610 included inside of the HR system 600 may be used to perform one or more elements of methods described herein. In one non-limiting example, the processor 610 may receive information from one or more of the sensors 640 and send that information through the wireless network adapter 622 to an external processor, such as a cloud processing system or an external server. The external processor may then process the sensor information to identify an object in the FOV and send information about the object, such as its shape and location in the FOV and/or information about the internal structure of the object, to the processor 610 through the wireless network adapter 622. The processor 610 may then use the geometry, appearance and location of the object in the FOV as well as the internal structure of the object, to render an X-ray view of the object as an overlay element and show the overlay element on the display 650.

In some embodiments, the instructions 632 may instruct the HR system 600 to detect one or more objects in a field-of-view (FOV) using at least one sensor 640 coupled to the computer system 600. The instructions 632 may further instruct the HR system 600 to determine the world position of the one or more objects using at least one sensor 640. The instructions 632 may instruct the HR system 600 to use object detection to determine if one of the objects is a hand and so determine the path of the hand over time using time-based samples from the at least one sensor 640. The instructions 632 may further instruct the HR system 600 to match the path of the hand to known path shapes using stochastic methods to determine a gesture. If a gesture is recognized, the instructions 632 may instruct HR system 600 to generate an input event of a specific type.

In some embodiments, the instructions 632 may instruct the HR system 600 to detect one or more objects in a field-of-view (FOV) using at least one sensor 640 coupled to the computer system 600. The instructions 632 may further instruct the HR system 600 to determine the world position of the one or more objects using at least one sensor 640. The instructions 632 may instruct the HR system 600 to create an X-ray window on one or more of the objects and establish a view position for the X-ray window on an object. The instructions 632 may further instruct the HR system 600 to receive data associated with one or more at least partially occluded objects at the view position. Finally, the instructions 632 may further instruct the HR system 600 to render the one or more partially occluded objects in the created X-ray window.

Figure 7A:
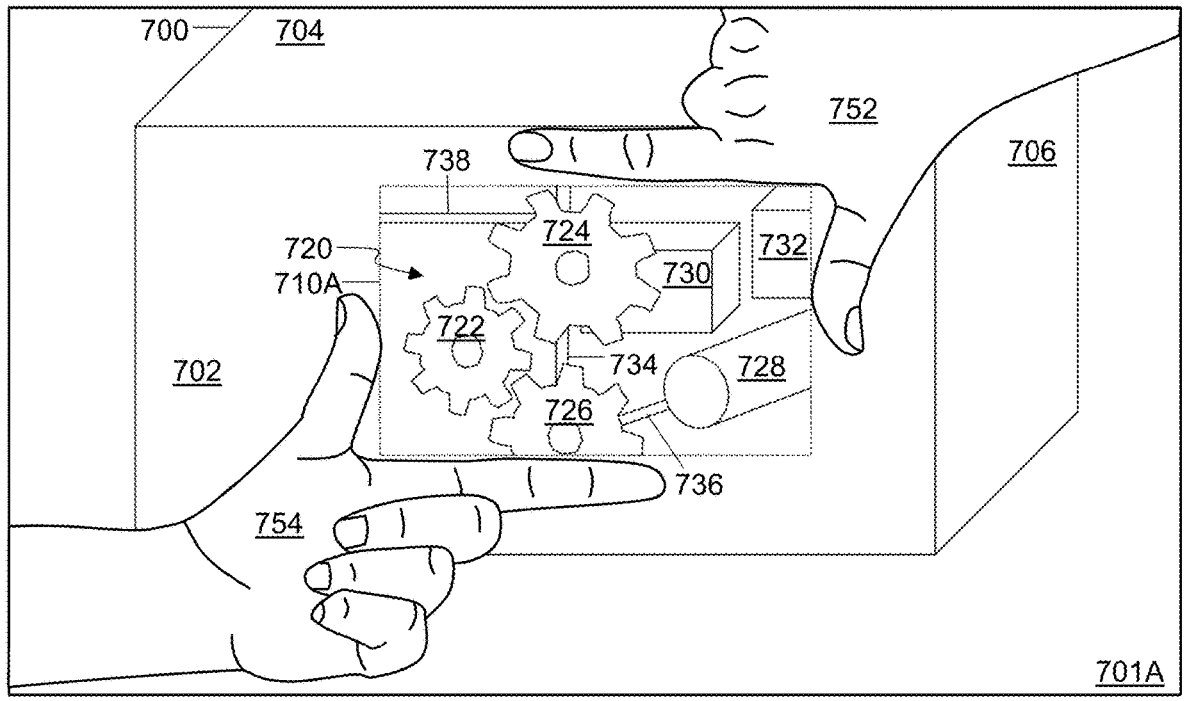
FIG. 7A/B show a single X-ray window rendered on a real-world machine on an embodiment of an HR system as a user perspective changes.
Figure 7B:
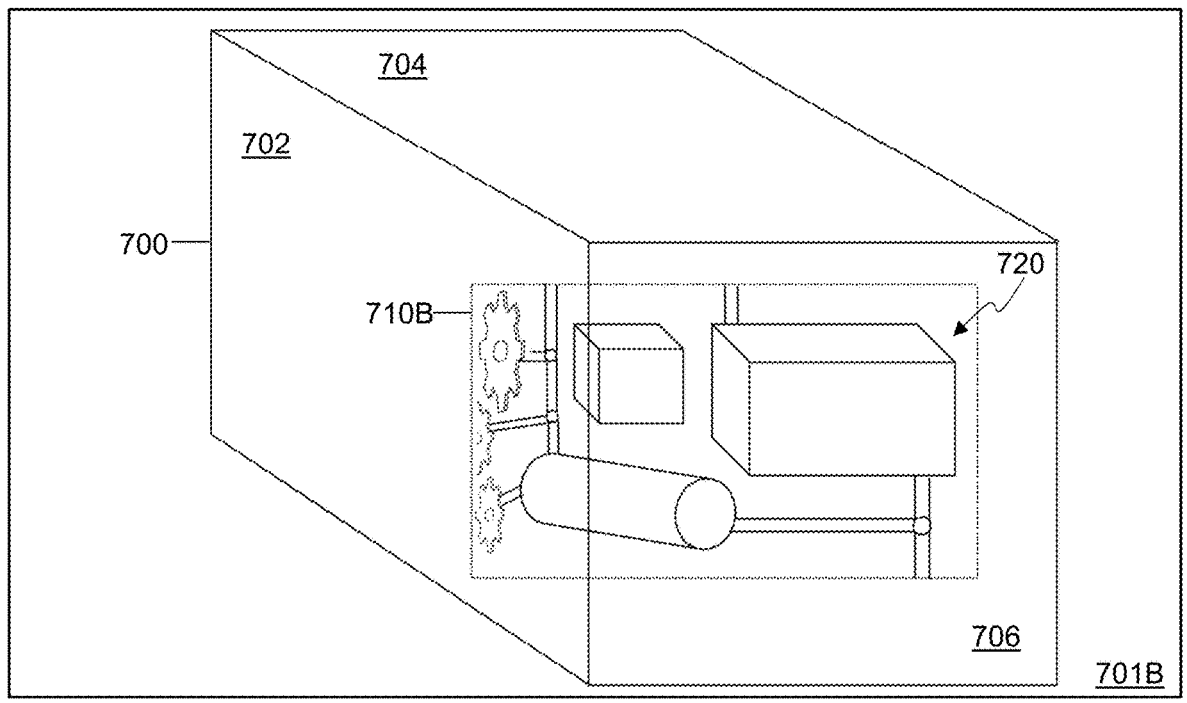

FIG. 7A shows a single X-ray window 710A rendered on a real-world machine presented on an embodiment of an HR system in view 701A. The real-world machine 700 is completely enclosed by opaque covers 702, 704, 706. On the display of an example HR system, a rectilinear X-ray window 710A is rendered to reveal internal components 720, such as gears 722, 724, 726, cylinder 728, blocks 730, 732, and rods 734, 736, 738. Note that internal components 720 are presented in the correct position and perspective; for example, block 730 is partially occluded by gear 724 and only part of gear 726 can be seen in window 710A. In some embodiments, the X-ray window 710A may be initiated and/or controlled by a trigger event, such as a hand gesture by the user using their right hand 752 and left hand 754. The hands 752, 754 may be visible in the view 701A. As one non-limiting example gesture, the user may use their hands 753, 754 to create a rectangular shape. In response to such a gesture, the HR system may initiate the X-ray window 710A. The location of X-ray window 710A may be determined based on the relative location of the hands 752, 754 and the machine 700 in the view 701A. In an alternative embodiment, the location of the X-ray window 710B may be controlled by the relative location of hands 752, 753 to a sensor of the HR system. FIG. 7B shows the machine 700 of FIG. 7A presented on an embodiment of a head-mounted display with a rendered X-ray window 710B from a different user perspective in view 701B. Similar to the vignette in FIG. 7A, the added X-ray window 710B is maintained as user perspective is changed. Note that in the example embodiment, the X-ray window 710B remains perpendicular to the user's eye-line which may be determined by the position of an HMD worn by the user. In other embodiments, the X-ray window 710A may remain in a fixed position with respect to the real-world machine 700 (e.g. appearing as anchored to a location on the real-world machine 700), acting as a view-port into the machine 700, with the determination of which internal components 720 are visible dependent upon the relative positions of the user and the X-ray window 710A. The change in position of X-ray window 710B from the position of FIG. 7A renders the internal components 720 of machine 700 from the new user perspective and location. Note that in some embodiments, the change in position of X-ray window 710B may be made using specific commands to the HR system, thus not requiring the user of the HR system to move, although the user perspective may change due to movement by the user, various gestures, or other command to the HR system.

Figure 8A:
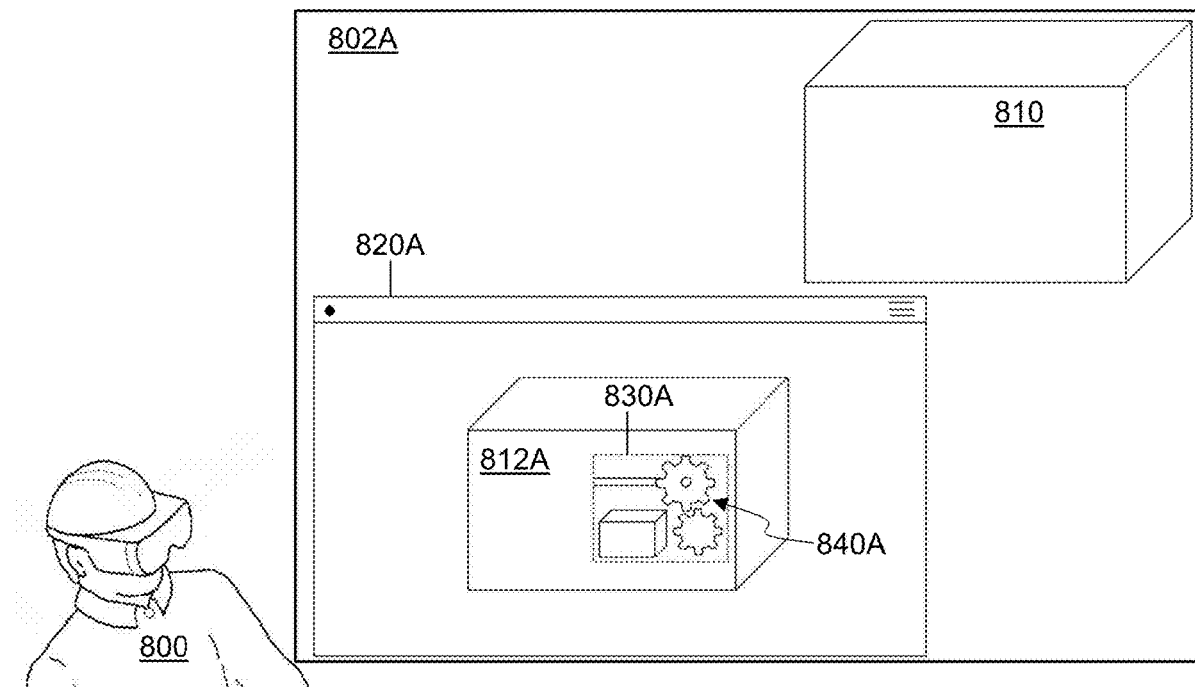
FIG. 8A/B show a single X-ray window rendered on an embodiment of a head-mounted display in different apparent positions between a user and a real-world object with different magnifications.

FIG. 8A shows a single X-ray window 820A rendered on an embodiment of a head-mounted display (HMD) in an apparent position between a user and a real-world object. In the real-world, there is a user 800 and a machine 810 which is completely enclosed by opaque covers. On the display of the HMD worn by user 800, a view 802A includes an example X-ray window 820A which has been rendered between the user 800 and machine 810. In the example embodiment, the X-ray window 820A is opaque and may occlude or partially occlude real-world objects. In other example embodiments, the X-ray window may be transparent with only some real-world objects partially occluded. In X-ray window 820A, the HR system that includes the HMD renders a representation 812A of machine 810 at a specific magnification determined by the HR system. Additionally, X-ray window 820A renders a sub X-ray window 830A, which reveals internal components 840A. Note that internal components 840A are rendered at the correct perspective and location with respect to representation 812A and at the same magnification.

Figure 8B:
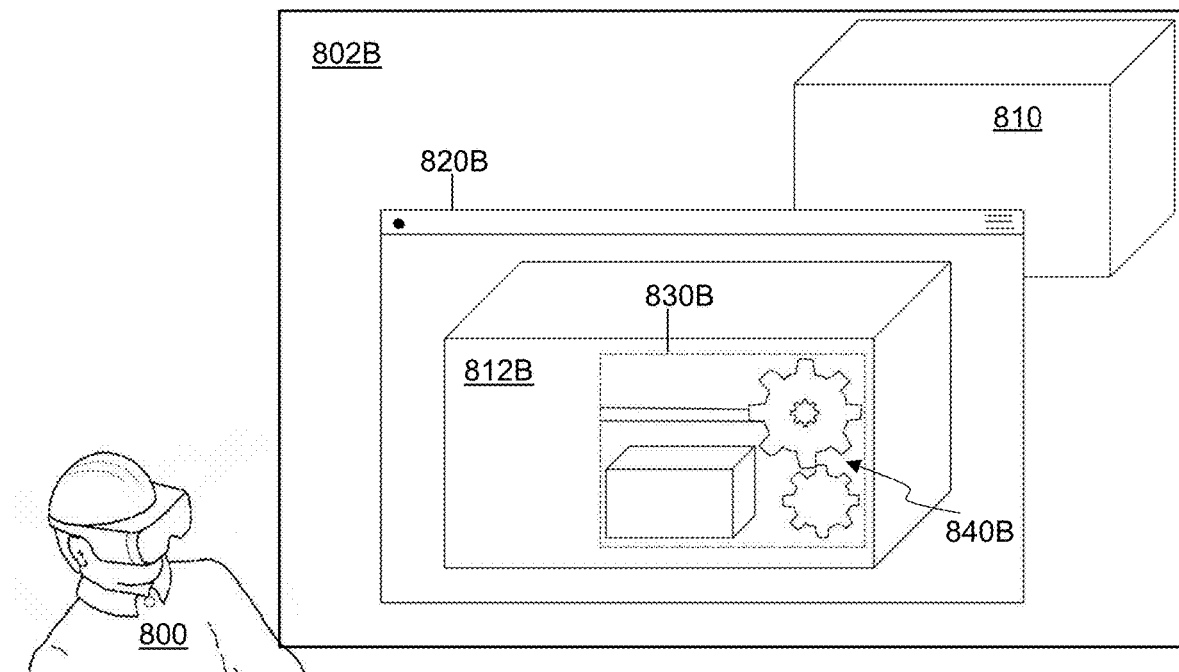
FIG. 8C/D show an alternative X-ray window rendered on an embodiment of a head-mounted display in associated with different positions on a real-world object.

FIG. 8B shows a single X-ray window 820B rendered on an embodiment of a head-mounted display in an apparent position between a user 800 and a real-world object 810 with magnification. Similar to the vignette in FIG. 8A, X-ray window 820B is rendered as an opaque window between user 800 and real-world machine 810 in a view 802B shown on the HMD. At the time of FIG. 8B, the X-ray window 820B is in an apparent position closer to machine 810 compared to the time of FIG. 8A. The position of the X-ray window 820B may be manipulated by the user 800 using hand gestures, eye gestures, voice commands, human input devices coupled to the HR system such as a keyboard, traditional mouse, or 3D input device, or any other type of input to the HR system. Note that X-ray window 820B partially occludes machine 810 at the new position. In the example embodiment, the HR system computes a new magnification factor based on the new position of X-ray window 820B. In X-ray window 820B, the HR system renders a representation 812B of machine 810 at the new magnification determined by the HR system. Additionally, X-ray window 820B renders a sub X-ray window 830B, which reveals internal components 840B. Note that internal components 840B are rendered at the correct perspective and location with respect to representation 812B and at the same magnification.

Figure 8C:
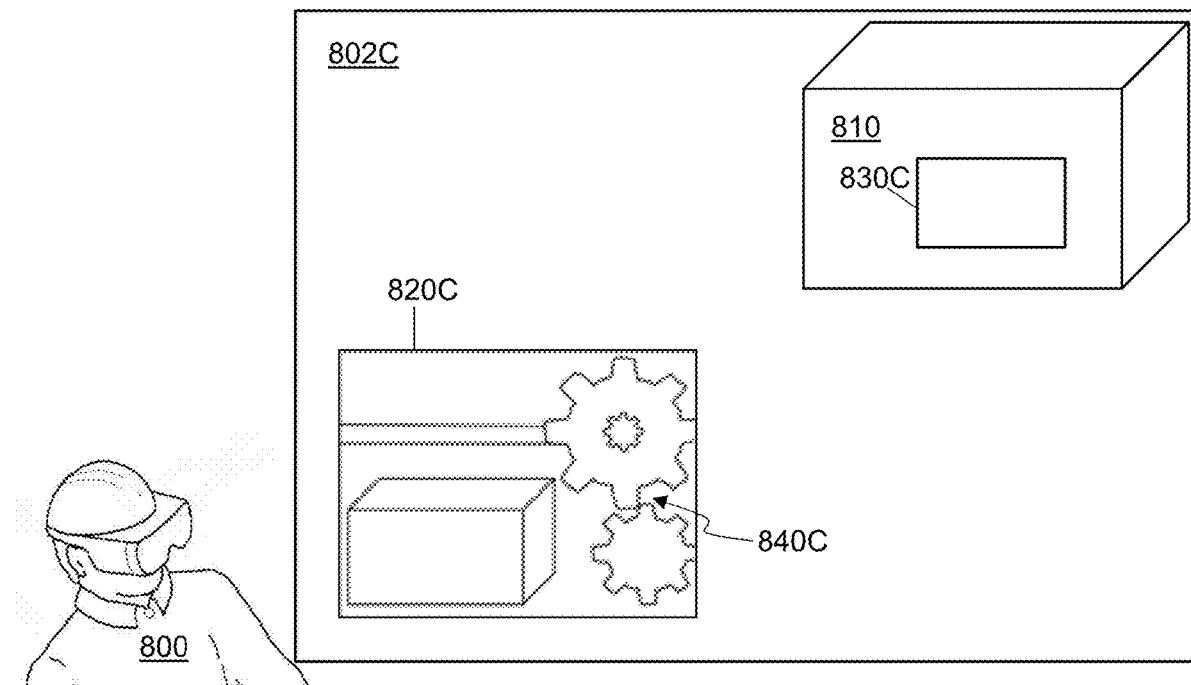

FIG. 8C shows an X-ray window 820C rendered in view 802C on an embodiment of a head-mounted display of an HR system. The X-ray window 820C shows internal structure 840C of the real-world machine 810 behind the virtual window 830C. The user 800 may provide input to the HR system to change the size and position of the virtual window 830C to show different views and/or magnifications of the internal structure. The portion of the internal structure of the machine 810 occluded by the virtual window 830C is then rendered into the X-ray window 820C with proper magnification, and perspective. In some embodiments, the size and position of the X-ray window 820C may also be changed by the user 800 independently from the size and position of the virtual window 830C.

Figure 8D:
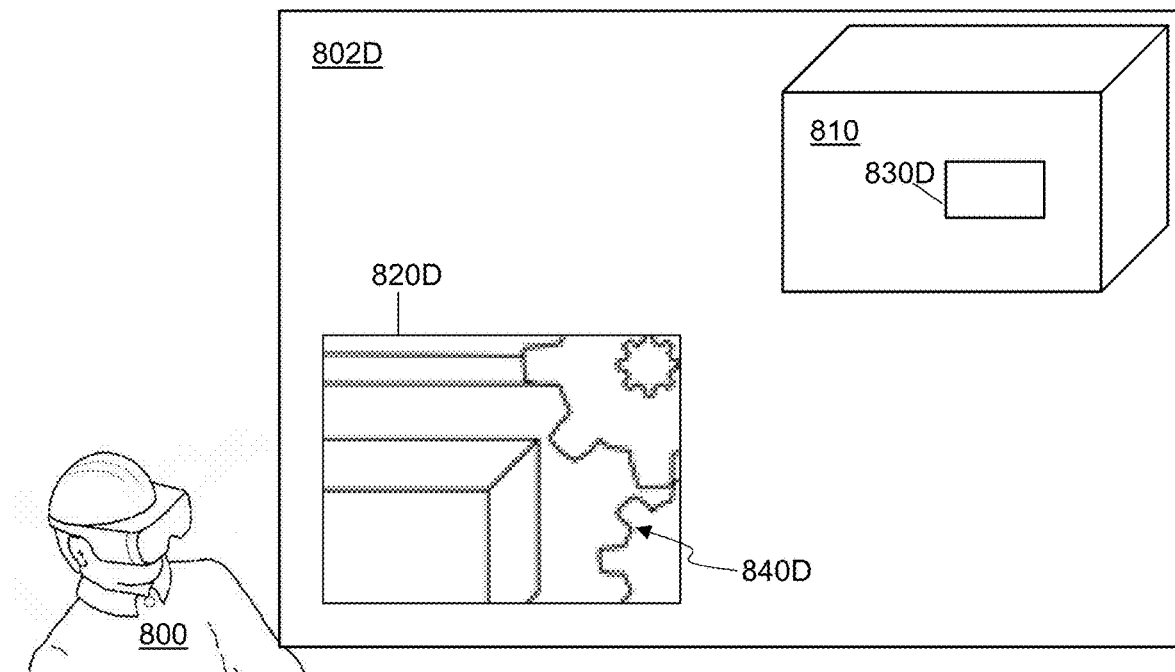

FIG. 8D shows an X-ray window 820D rendered in view 802D on an embodiment of a head-mounted display of an HR system. The user has changed the size and position of the virtual window 830D to be smaller and to include only a center portion of the virtual window 830C shown in FIG. 8C. The X-ray window 820D is in the same position and has the same size as the X-ray window 820C of FIG. 8C, so it shows a magnified view of the internal structure 840D of the real-world machine 810 that is occluded by virtual window 830D. Note that in some embodiments, the amount of magnification may be altered by either changing the size or position of the virtual window 830D, or by issuing input commands specific to the X-ray window 820D.

Figure 9A:
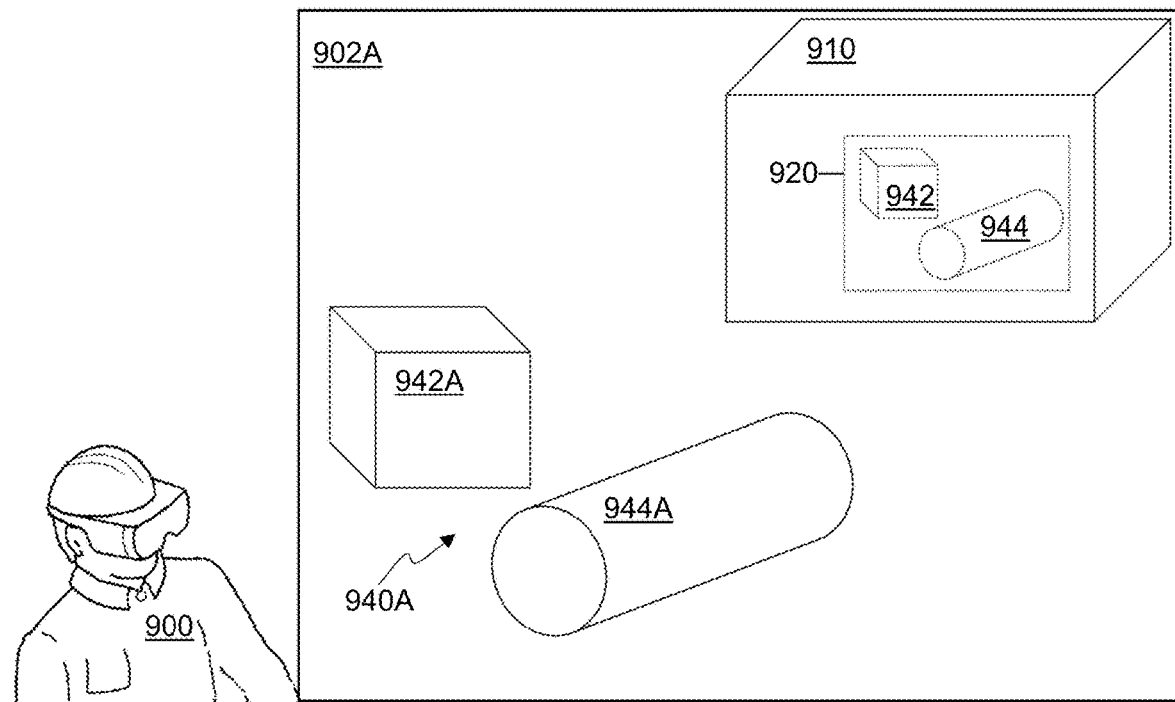
FIG. 9A/B show different views of a snapshot of the internals of a machine presented on an embodiment of a head-mounted display rendered as if in free space.

FIG. 9A shows a snapshot of the internals 942, 944 of a machine 910 presented in a view 902A on an embodiment of a head-mounted display rendered as if in free space. At the time of FIG. 9A, the example HR system has taken a first "snapshot" 940A of internal components 942, 944 of machine 910. Prior to the time of FIG. 9A, the HR system had rendered an X-ray window 920 on machine 910 on the HMD of user 900. During rendering of X-ray window 920, internal components 942, 944 were rendered in the correct perspective and at the geometrically correct location with respect to machine 910. When the first snapshot 940A is created by the HR system, component 942 is rendered in free space as representation 942A in the same orientation as representation 942. Similarly, component 944 is rendered in free space as representation 944A in the same orientation as representation 944. Once the snapshot has been captured, the X-ray window 920 may be removed from view 902A or retained, depending on user preferences and/or commands supported by the embodiment. Note that the magnification factor and apparent position of snapshot 940A may take any initial value as determined by the HR system embodiment. Note further that the snapshot in some embodiments will maintain the correct relative positions between representations 942A and 944A at the determined perspective and magnification.

Figure 9B:
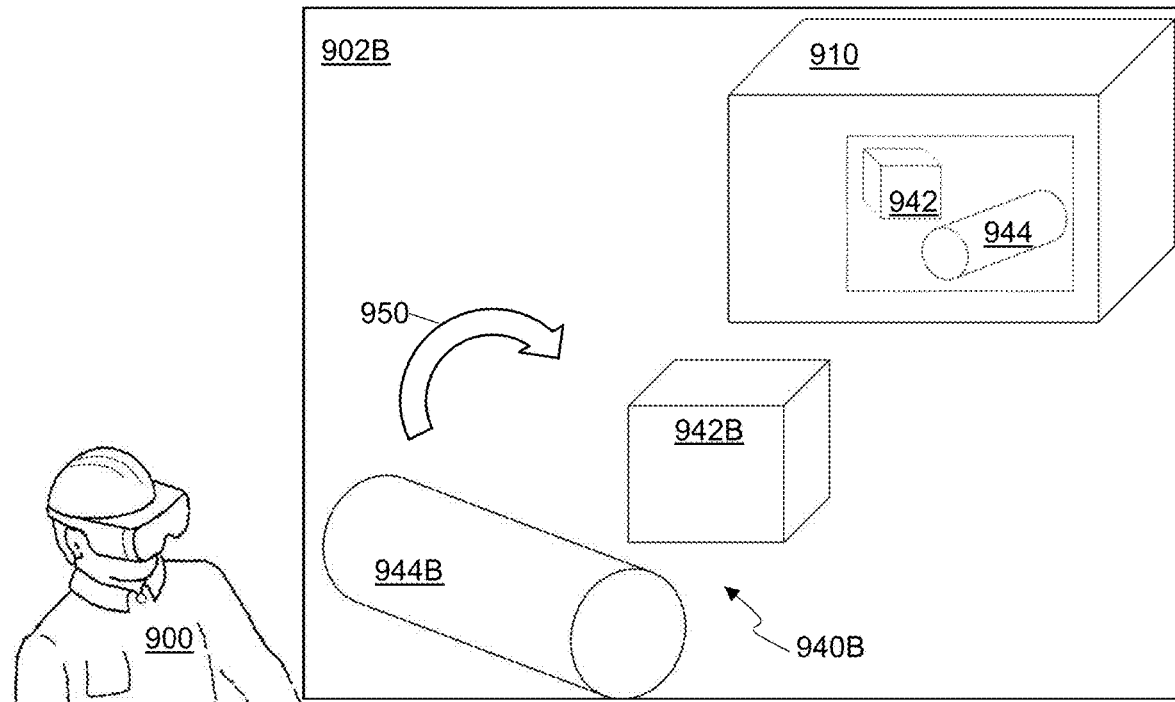

FIG. 9B shows a snapshot of the internals 942, 944 of a machine 910 presented in a view 902B on an embodiment of a head-mounted display rendered as if in free space with a rotation applied. Similar to the vignette in FIG. 9A, a snapshot 940B is rendered on the HMD embodiment worn by user 900. FIG. 9B is at an instant of time after the initial creation of FIG. 9A, and the user has rotated the snapshot in the direction of arrow 950. The rotation may be due to user 900 moving around a static snapshot 940B, user 900 issuing commands to the HR system, or any other suitable mechanism. Note that the orientation of representations 942B, 944B in snapshot 940B is rendered at the new perspective and position maintaining the relative positions of representations 942B, 944B. In some embodiments, the snapshot may be viewed at different positions using translational and rotational user 900 movement and/or commands issued to the HR system. It is also contemplated that the snapshot may be manipulated using other interactions that aid the user 900 in obtaining information about internal components 942, 944 of machine 910, such as, but not limited to, snapshot magnification, pulling apart snapshot components, hiding one or more snapshot components, or changing the appearance (e.g. color, transparency, wire-frame) of one or more snapshot components.

Figure 10:
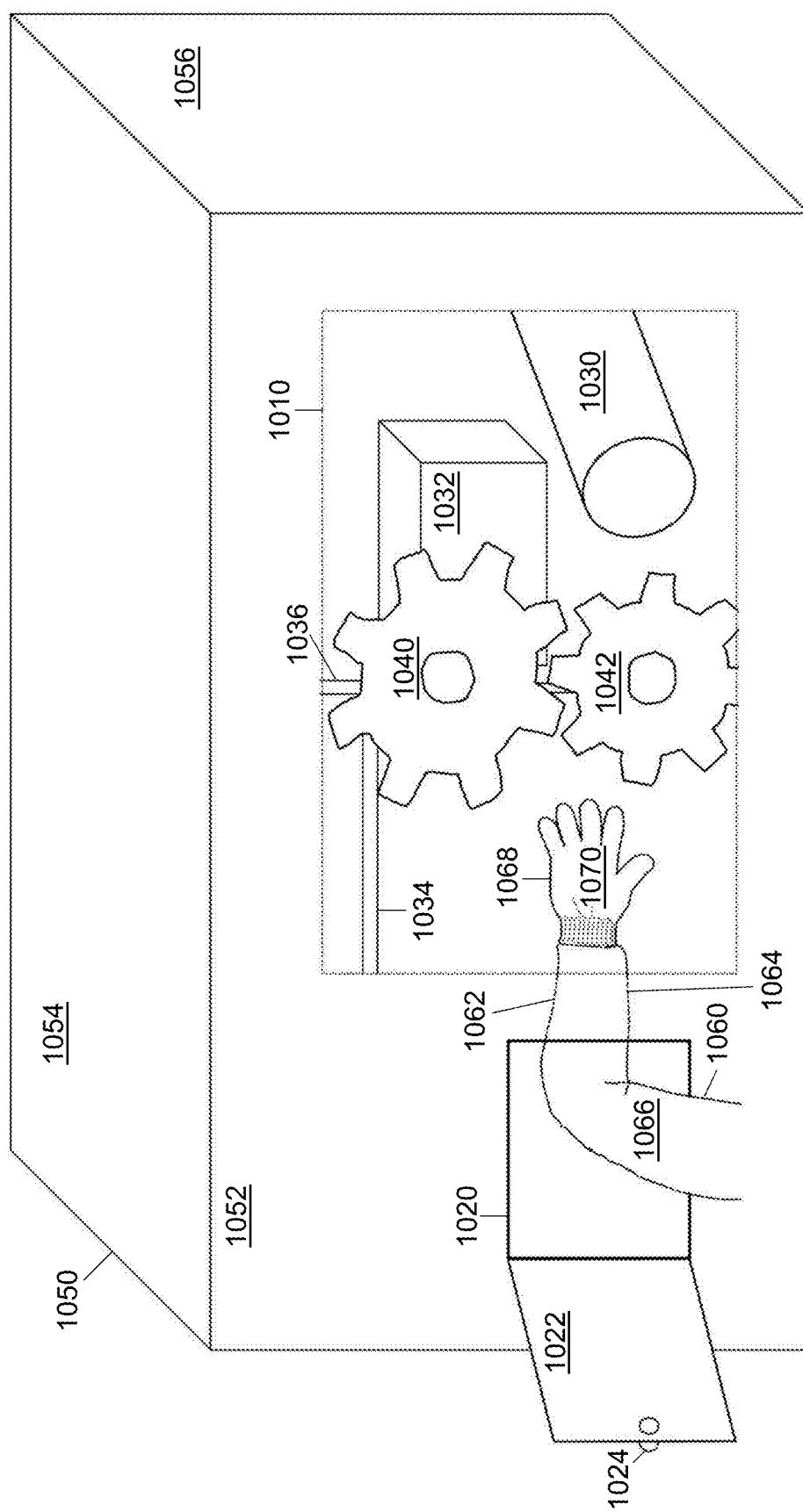
FIG. 10 shows a scene presented to a user wearing an embodiment of a head-mounted display showing internal details of a machine and a hand inserted into an access panel.

FIG. 10 shows a scene presented to a user wearing an embodiment of a head-mounted display showing internal details of a machine 1050 and a hand 1070 inserted into an access panel 1020. The scene of FIG. 10 shows an X-ray window 1010 added to a view of a real-world machine 1050 enclosed by an opaque cover 1052, 1054, 1056 on each side. Included on machine 1050 is an access panel 1020 opened using knob 1024 on door 1022. Within machine 1050 are several hidden components, including cylinder 1030, block 1032, rods 1034, 1036, and gears 1040, 1042. The location of components cylinder 1030, block 1032, rods 1034, 1036, and gears 1040, 1042, may be obtained from schematics of machine 1050 transmitted to the HR system based on, for example, an identification or location of machine 1050. At least portions of components cylinder 1030, block 1032, rods 1034, 1036, and gears 1040, 1042 are within X-ray window 1010 and so are rendered within the window 1010. Note that the window 1010 occludes some portions of cylinder 1030, rod 1034, rod 1036, and gear 1042, and that the relative positions of components cylinder 1030, block 1032, rods 1034, 1036, and gears 1040, 1042 is shown by, for example, block 1032 being occluded by gear 1040.

At the time of FIG. 10, the user 1060 is manipulating internal components by inserting hand 1068 wearing glove 1070 into the open access panel 1020. A portion of user's arm 1066 is visible because it is outside machine 1050, but the rest of the user's arm, including hand 1068, is occluded by cover 1052. In the rendering of the example HR embodiment, a portion of the arm, i.e. hand 1068, is shown within X-ray window 1010. Note that a portion of the arm, indicated by dotted lines 1062, 1064 may not be rendered on the HMD. The rendered representation of hand 1068 may be photo-realistic, use an avatar, or any other representation to indicate a hand to a user. The position of hand 1068 may be received from data provided by sensors in glove 1070, for example gyroscopes. In other example embodiments, the position of hand 1068 may be received from a device being held by hand 1068, for example a robotic extension, a tool, or a controller. In yet other example embodiments, the position of the hand may be determined using computation, such as, but not limited to, body position physics as the arm is moved, an internal camera in the machine, using data from external sensors that may partially penetrate a cover, or computed from the visible portion of the arm and known body dimensions.

In some embodiments, the glove 1070 may be used to control the HR system. Glove 1070 may incorporate sensors, such as, but not limited to, a gyroscope and accelerometer for detecting and tracking the position and movement of a hand, a finger, or a body pose. As a non-limiting example, the user may raise her right hand encased in the glove 1070 and the HR system may receive signals representing the gesture from the glove 1070. The HR system may then interpret the gesture to represent one or more commands, such as, but not limited to, changing a size of a video image, changing the size of images of virtual objects, and then execute those commands. In yet another embodiment, a wave of the hand in the glove 1070 may be interpreted to represent a command to rotate or move a virtual object. In some embodiments, a movement of the glove 1070 may be used for changing an on/off state of the HR system.

Note that occluded objects viewed in an X-ray window may be rendered in other ways than those explicitly described herein without departing from the concepts disclosed. Whether to display all, some, or none of an occluded object may be done in any manner, including, but not limited to, a position and size of virtual window or X-ray window, a user preference, a context (e.g. a task at hand), or an explicit user command. The X-ray window showing the occluded objects may be separate from, or aligned with, a virtual window used to select the occluded objects and the size and position of the X-window may be controlled together with, or separately from, a virtual window. The X-ray window may show only occluded objects, or may show a combination of visible and occluded objects, depending on the embodiment. A magnification of the occluded objects shown in the X-ray window may be determined in any manner, including, but not limited to, a virtual position of the X-ray window, a size of a virtual window, a size of the X-ray window, or a separate magnification input provided to the HR system by the user or some other entity. A border of the X-ray window may or might not be shown, depending on the embodiment. The rendering of the occluded objects in the X-ray window may be opaque or partially transparent, and a background area of the X-ray window may be completely transparent, partially transparent, or opaque depending on the embodiment.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 11:
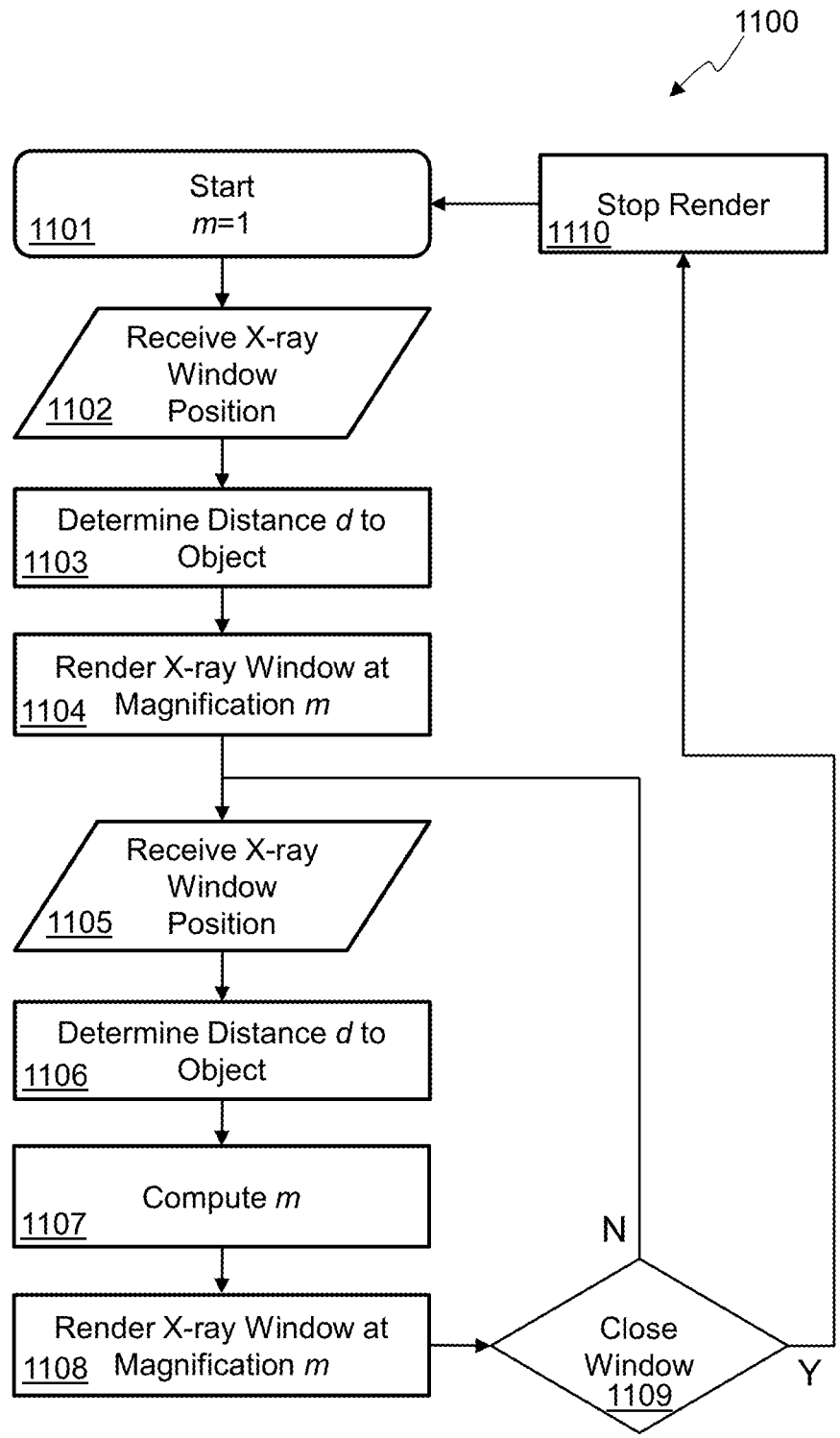
FIG. 11 shows a flowchart of an embodiment of a method for creating a magnifying glass.

FIG. 11 shows a flowchart 1100 of an embodiment of a method for creating a magnifying X-ray window. The method starts 1101 by setting a magnification 'm' to an initial value, such as unity, and a position for an X-ray window is received 1102 from commands, for example a "create magnifying window" command input to the HR system in some embodiments. The distance 'd' from the X-ray window apparent position in 3D space to the real-world object with the X-ray view is determined 1103; in some embodiments is a default value and in some embodiments 'd' is computed from the position of the user at the time of creating the X-ray window, for example placing the window at some known ratio of the distance between the user and the real-world object with the X-ray view.

The flowchart 1100 continues by rendering 1104 the X-ray window at magnification 'm' (in this case unity) at apparent distance 'd' in 3D space. The flowchart 1100 continues by receiving 1105 a new position for the X-ray window, for example a "drag magnifying window" command input to the HR system in some embodiments. The flowchart 1100 continues by determining 1106 a new distance 'd', for example using relative motion specified by the user when applying a "drag magnifying window command" input to the HR system in some embodiments. A new magnification factor 'm' is computed 1107 using the previous and current values of 'd'. In some embodiments, a fixed scaling factor may also be applied to keep the magnification 'm' within specific limits defined by the HR system.

The flowchart 1100 continues by rendering 1108 the X-ray window at new magnification factor 'm' at current apparent distance 'd' in 3D space. The flowchart 1100 continues by determining whether a close window instruction has been received during stages 1105, 1106, 1107, 1108. If the window is to be closed, the X-ray window stops 1110 rendering and returns to start 1101. If the window remains active, the flowchart 1100 loops to receiving 1105 an X-ray window position.

Note that any input command loop in flowchart 1100 is purely notional; an interrupt-driven handler or software event handler may be used in some embodiments to save power or simplify code creation.

Figure 12:
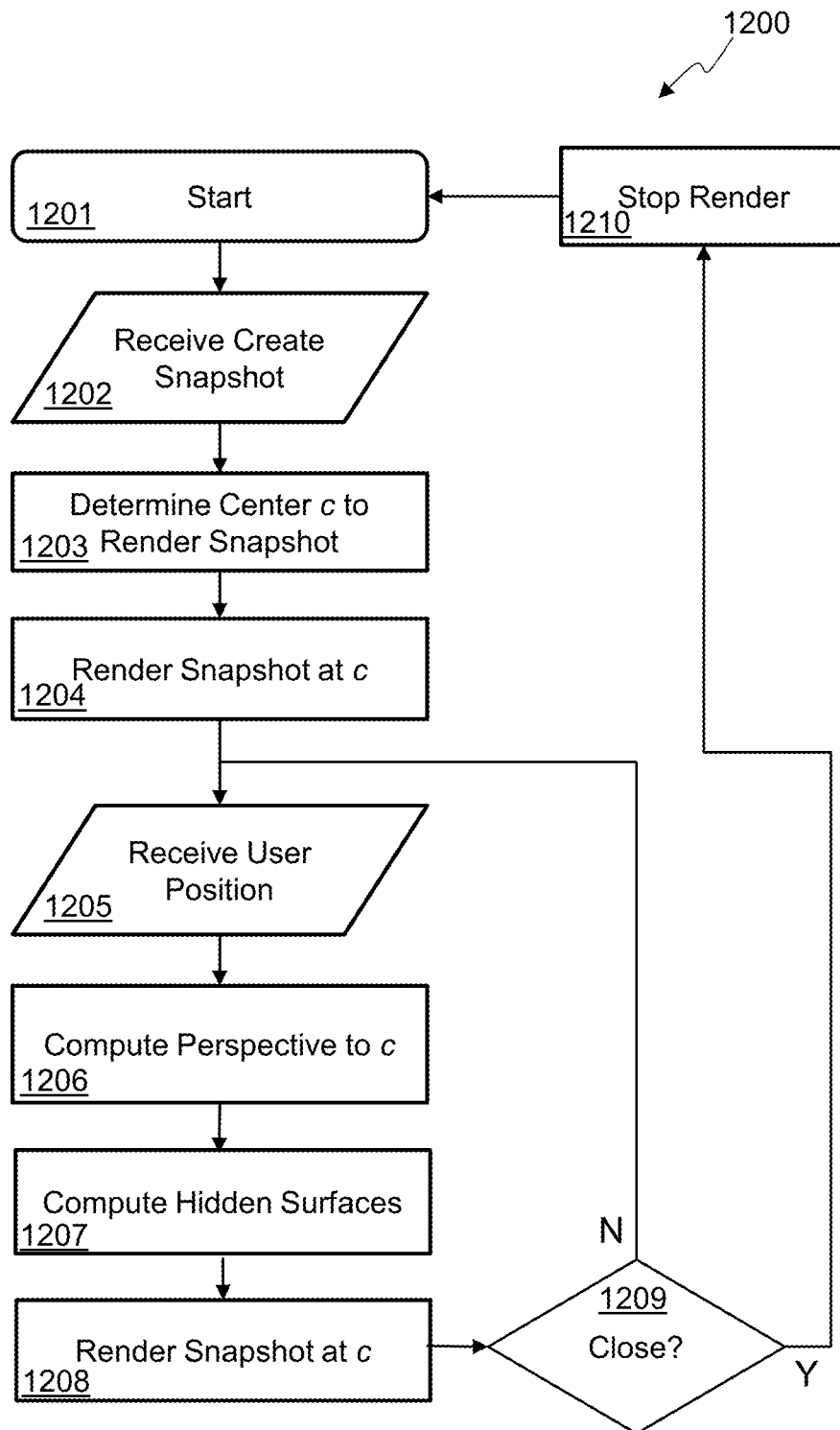
FIG. 12 shows a flowchart of an embodiment of a method for creating a 3D snapshot.

FIG. 12 shows a flowchart 1200 of an embodiment of a method for creating a 3D snapshot of an X-ray window. The method starts 1201 and a create snapshot command is received 1202 as input to the HR system. In some embodiments, there must be an X-ray window active at the time the create snapshot command is received, but in others a default X-ray window is created. The flowchart 1200 continues by determining 1203 a center 'c' for the snapshot in real-world space. In some embodiments 'c' is a default value and in some embodiments 'c' is computed from the position of the user at the time of creating the snapshot, for example placing the 'c' at some known ratio of the distance between the user and the real-world object with the X-ray view. In yet another example embodiment, 'c' may be determined using locations of known real-world objects to place 'c' at a position of maximum clearance from real-world objects so the user can physically move around the virtual snapshot in the real-world.

The flowchart 1200 continues by rendering 1204 the snapshot at apparent distance 'c' in 3D space. The flowchart 1200 continues by receiving 1205 a new position for user, for example a relative motion determined by the HR system in some embodiments. The flowchart 1200 continues by determining 1106 a new perspective to point 'c' for the user using triangulation. Depending on the perspective, the hidden surfaces of components in the snapshot are computed 1207, and the snapshot rendered 1208 at the new perspective, making the snapshot appear fixed in real-world space.

The flowchart 1200 continues by determining whether a close window instruction has been received during stages 1205, 1206, 1207, 1208. If the window is to be closed, the X-ray window stops 1210 rendering and returns to start 1201. If the window remains active, the flowchart 1200 loops to receiving 1205 a new user position.

Note that any input command loop in flowchart 1200 is purely notional; an interrupt-driven handler or software event handler may be used in some embodiments to save power or simplify code creation.

Figure 13:
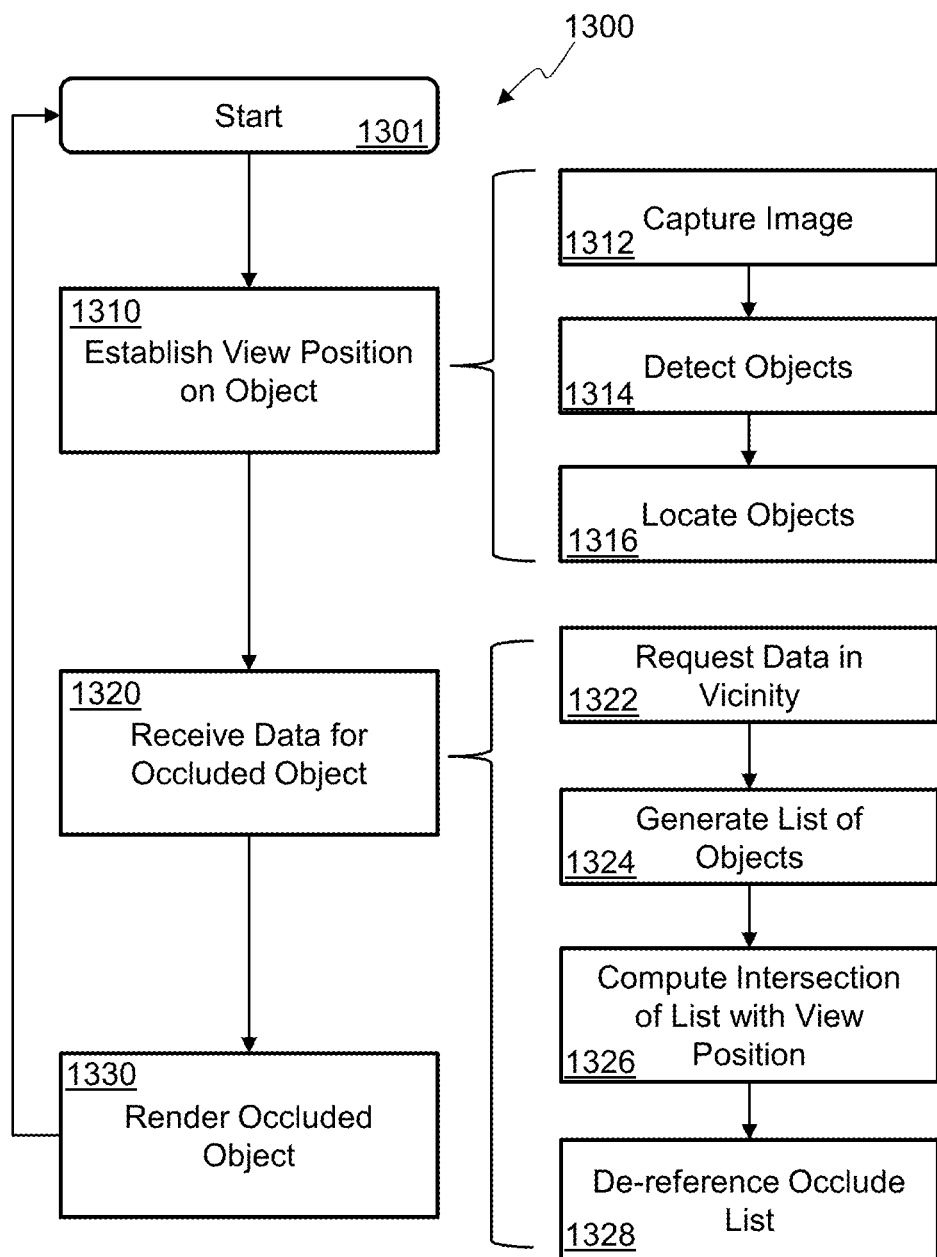
FIG. 13 shows a flowchart of a first embodiment of a method for providing information obscured to a user through a display of a hybrid-reality system (DHR)

FIG. 13 shows a flowchart 1300 of a first embodiment of a method for providing information obscured to a user through a display of a hybrid-reality system (DHR). The DHR may be a head-mounted display (HMD). The method starts 1301 and a view position is established 1310 relative to a real-world object. The view position establishes a position of a viewer with respect to the real-world object and so sets a field of view for the viewer. The view position may be established in many different ways, for example a user of the hybrid-reality system may manually provide the view position. In at least one embodiment, the view position is received from an entity that is not the user of the hybrid-reality system. In other embodiments, the view position may be established based on a real-world position of the DHR and/or a user of the hybrid-reality system. As non-limiting examples, the view position may set to the real-world location of the DHR with a field of view based on the orientation of the DHR, or the view position may be set at a location between the DHR and the real-world object. The position may be determined using sensors in the DHR, such as a GPS receiver and/or accelerometers, based on triangulation from other radio-frequency sources such as WiFi access points, cellular towers, dedicated radio-frequency beacons, or any other location determination mechanism. In some embodiments, a field of view from the view position may be mapped to a full screen of the DHR.

In some embodiments the view position is established 1310 by capturing 1312 an image of the field-of-view using a camera coupled to the HR system. Using object recognition, objects in the field of view are detected 1314. The position of the detected objects is computed using depth information from a sensor coupled to the HR system. By using depth and object orientation, the objects can be located 1316 in 3D real-world space.

The flowchart 1300 continues by receiving 1320 data associated with an occluded object that is at least partially occluded at the user's viewpoint. The occluded object may be occluded by the real-world object. In some embodiments a characteristic of the real-world object is determined and the data associated with the occluded object is based on the characteristic of the real-world object, and in at least one embodiment the data associated with the occluded object includes information related to the real-world object. The characteristic of the real-world object may, for example, be an image of the real-world object, an identity of the real-world object, a message received from the real-world object, or the location of the real-world object. As a non-limiting example, the data associated with the occluded object may include a schematic, plan, blueprint, or map of the real-world object. In some embodiments, the received data associated with the occluded object is based on data from one or more sensors. The sensors may be integrated into the DHR, the hybrid-reality system, or be remote from the hybrid-reality system. The data from the sensors may be received in real-time or near real-time in some cases. The received data associated with the occluded object may have been established at an earlier time, such as data collected during a visit at an earlier time to an area near the occluded object by one or more people using hybrid-reality systems with integrated sensors.

In some embodiments the occluded object data is received 1320 by requesting 1322 data within a vicinity of the view position. The HR system generates 1324 a list of objects in the vicinity, and computes 1326 an intersection of the list within the desired field-of-view at the view position to generate an occlude list. Data is received by de-referencing 1328 the objects on the occlude list, for example indexing a database.

The flowchart 1300 continues by rendering 1330 an image of at least a portion of the occluded object on the DHR. The image of at least the portion of the occluded object may be rendered at any level of detail or with any perspective or viewing parameters depending on the embodiment. Image rendering and/or viewing parameters may be received from the user or from an entity that is not the user and the parameters may be stored within the hybrid-reality system. In some embodiments, the image is rendered with a perspective based on a user position with respect to the real-world object or with a perspective based on parameters stored within the hybrid-reality system.

The method may also include establishing a window into the object to show the image, although some embodiments may simply show any occluded object visible in the field of view from the view position. The window may have any shape and may have an asymmetric shape in some embodiments. The image may be clipped to the window in some embodiments. The window may also be referred to as an X-ray window, a view-port, or a virtual window. The flowchart 1300 then returns to the start 1301.

In some embodiments the window may be positioned to at least partially occlude the real-world object and the image rendered in a position in the window corresponding to a real-world position of the occluded object. This may present the appearance of an opening in the surface of the real-world object which allows the user to see inside of, or behind, the real-world object, so creating a view of a space occluded behind a surface of the real-world object. In some embodiments, the window may be positioned to fully occlude the real-world object, for example with a shape of the window corresponding to a shape of the real-world object. This may create an appearance of making the entirety of any occluded objects hidden by the real-world object visible. In other embodiments, the window may be positioned independently from a real-world position of the occluded object, so allowing the user to view the occluded object in a different location in the field of view.

In at least one embodiment a window is created on the DHR that includes the image, the window positioned, at least in part, as a cut-away view of an occluded space behind a surface of the real-world object. The portion of the occluded object to render is determined as well as a perspective of the occluded object based on relative positions of the view position, the window, the real-world object, and the occluded object. A new view position is then established based on a new real-world position of the DHR. A new portion of the occluded object to render and a new perspective of the occluded object are then determined based on relative positions of the new view position, the window, the real-world object, and the occluded object. A new image of at least the new portion of the occluded object in the window on the DHR to replace the image of at least the portion of the occluded object on the DHR. In another embodiment, the window is moved to a new position on the DH. Then the new portion of the occluded object to render and a new perspective of the occluded object are determined based on relative positions of the view position, the new position of the window, the real-world object, and the occluded object.

In some embodiments, a hierarchical set of windows may be used to show different layers of occluded objects. A view position relative to a real-world object is established and data associated with an object occluded at the view position is received, where the occluded object at least partially occluded by the real-world object at the view position. A first window is created on the DHR and an image of at least a portion of the occluded object is rendered and clipped to the first window. A subsection of the occluded object in the first window is then selected and data associated with a second object occluded by the subsection of the occluded object is received. A second window is created on the DHR and a second image of at least a portion of the second object is rendered into in the second window. The second object may be located within or behind the occluded object. The second window may be positioned on the DHR independent of a position of the first window on the DHR in some embodiments. In other embodiments, the second window may be positioned to fully occlude the selected subsection of the occluded object in the first window, with a shape of the second window corresponding to a shape of the selected subsection of the occluded object.

Figure 14:
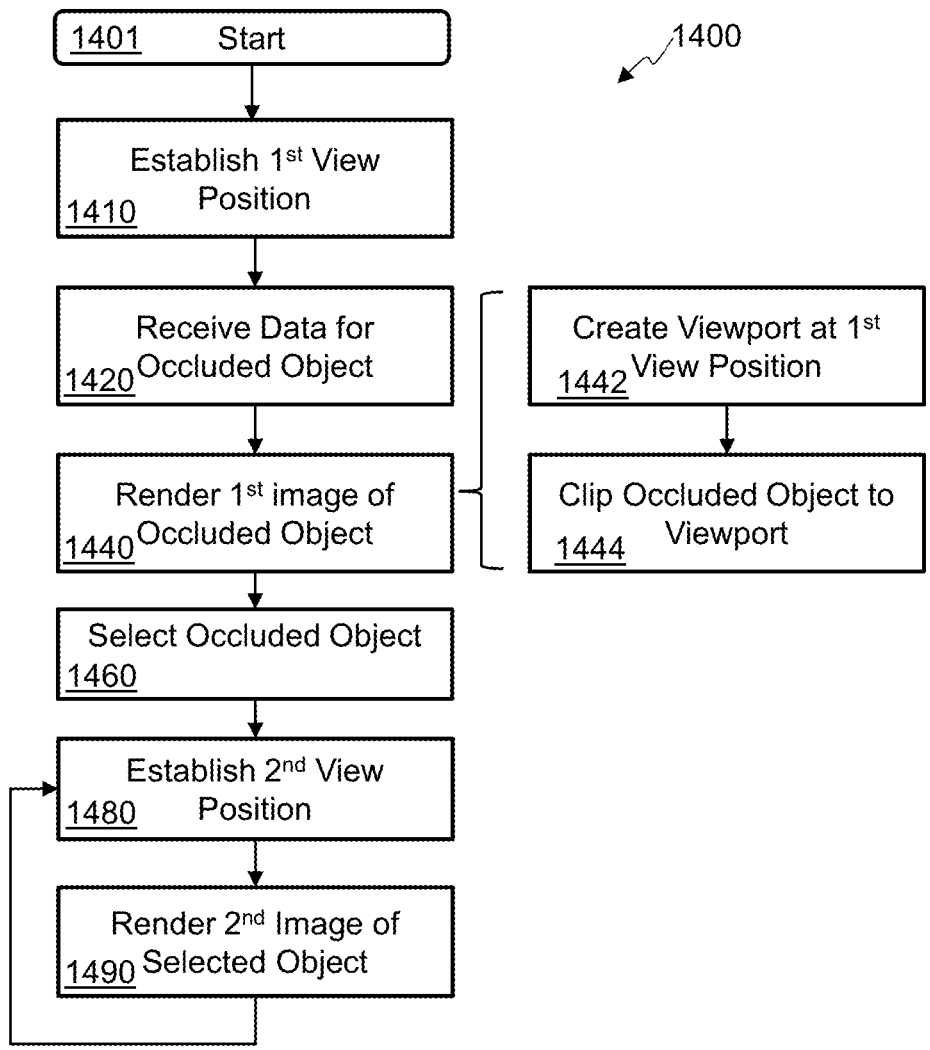
FIG. 14 shows a flowchart of a second embodiment of a method to provide information obscured to a user through a DHR.

FIG. 14 shows a flowchart 1400 of a second embodiment of a method for manipulating occluded objects shown through a display of a hybrid-reality system. The method starts 1401, and a first view position including a direction and location on a real-world object is established 1410. Data for one or more objects that are at least partially occluded by the real-world object at the first view position is received 1420. The data that is received includes information that may be used to determine dimensions and the location of the occluded objects, allowing the hybrid-reality system to render 1440 a first image of the occluded object as if the object were not occluded at the first view point. In some embodiments, a viewport is created 1442 on the real-world object by the hybrid-reality system and the rendering of the first image is clipped 1444 to the viewport.

The flowchart 1400 continues by selecting 1460 one or more occluded objects; in some embodiments the selection is made through user commands and in at least one embodiment the selection default is all occluded objects visible in first image. In at least one embodiment the selecting of the at least one occluded object includes receiving one or more commands from a user of the hybrid-reality system to select the at least one occluded object so that the at least one occluded object includes a first occluded object of the one or more occluded objects rendered in the first image and excludes a second occluded object of the one or more occluded objects rendered in the first image. A gesture of the user may be detected using a sensor coupled to the hybrid-reality system and the one or more commands may be determined based on the gesture. The flowchart 1400 continues by establishing 1480 a second view position; in example embodiments the second view position is a point in space outside the real-world object that the user can move around. A change of location of the DHR may be detected to establish the second view position in some embodiments. In some embodiments, input from the user of the hybrid-reality system, such as commands, one or more gestures, or any other type of input, may be received to establish the second view position. The flowchart also includes rendering 1490 a second image of the selected objects at the second view position.

In some embodiments a view port on the image of the real-world object is manipulated to set a size and/or a position of the view port and the rendering 1440 of the first image is clipped to the view port. In at least one embodiment the selecting 1460 is based on what is visible in the view port. In an example embodiment, a gesture by the user is detected using a sensor coupled to the hybrid-reality system to manipulate the size and/or position of the view-port. As a non-limiting example, gestures may also be used to command the hybrid-reality system to select 1460 the occluded object from the first image and deselect previously selected objects.

The second image may be rendered at a position on the DHR independent of (i.e. without regard to) a position of an image of the real-world object on the DHR. In some embodiments, the establishing 1480 a second view position uses a position that is not related to the position of an image of the real-world object on the DHR, such as, but not limited to, a point in the field-of-view that is determined to be empty of visible data, a point in space between the user and the real-world object, or a point in real-world space that the user can access determined to have no physical obstructions. In one example embodiment, the establishing 1480 a second view position is made iteratively to place the second image at an optimal position with maximum unobstructed surrounding space. In some embodiments, the establishing 1480 a second view position is a fixed point on the display (e.g. set using a system default or previously set by the user) used to create a separate window in which to render the second image on the DHR. In at least one embodiment, the second image is a representation of the selected occluded object as if it were a real-world object at the second position. In one non-limiting example, the second view position may be set by user movement, such as pointing to a point in space or using a point between a new user position and the real-world object.

In some embodiments the rendering 1490 of a second image causes the first image to be removed; whether to remove or keep the first image may be a parameter in the hybrid-reality system or controlled by an explicit command issued by the user. So in some embodiments, the first image and the second image may be presented on the DHR simultaneously.

In at least one embodiment, the establishing 1480 a second view position continues as a series of subsequent view positions 1480 and the rendering 1490 of the second image updated based on each view position (which has both direction and location) to create an interactive display on the DHR. In some embodiments, the user may move around the rendered second image in space to observe the selected occluded object from different perspectives. This may be achieved in at least one embodiment by using sensors coupled to the DHR (e.g. cameras in the environment, gyroscopes in a head-mounted system, a GPS receiver, or cameras mounted on the user) to establish a set of user positions in space and so generate a series of view positions used to render the interactive display of the selected occluded object. In example embodiments, the series of view positions used to render the interactive display of the selected occluded object may be set by the user issuing a series of commands interpreted by the hybrid-reality system as a series of view positions, such as, but not limited to, tracking hand motion or a pointer, tracking eye movement, or tracking head orientation over time.

In some embodiments, a first location and a first orientation of the DHR may be determined using sensors in the DHR at a first time to establish the first view position based on the first location and the first orientation of the DHR. A virtual position may be established with respect to the first view location for a virtual presentation of the at least one selected objects. A second location and a second orientation of the DHR may be determined using the sensors in the DHR at a second time to establish the second view position based on the second location and the second orientation of the DHR. The at least one selected object may then be rendered from the second view position at the virtual position in the second image. In some embodiments, subsequent locations and subsequent orientations of the DHR may be determined using sensors in the DHR over a period of time to establish subsequent view positions, and subsequent images of the at least one selected occluded object generated on the DHR from the subsequent view positions at the virtual position in near real-time to create an interactive display on the DHR. The DHR may be a part of a head-mounted display.

Figure 15:
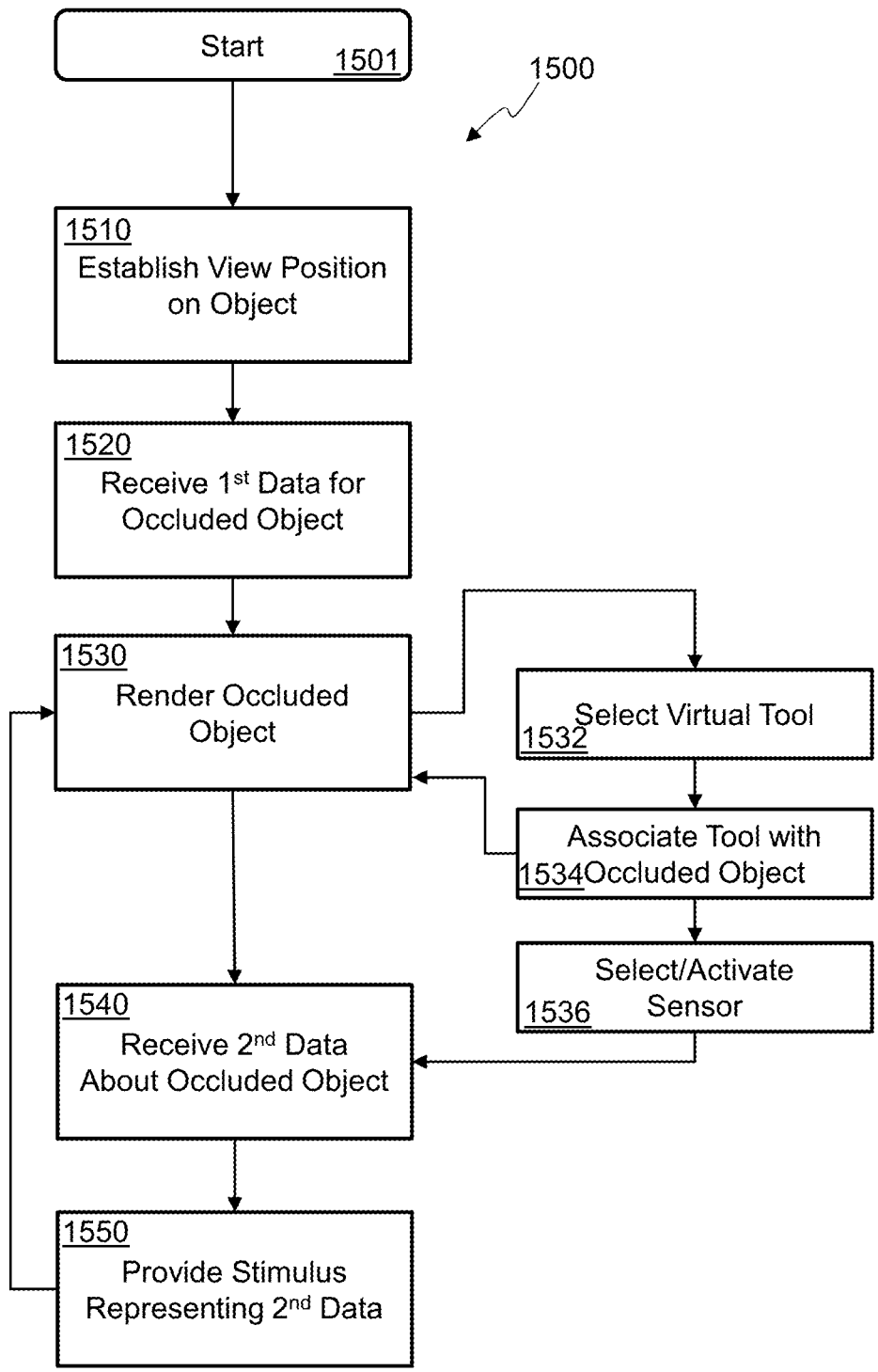
FIG. 15 shows a flowchart of a third embodiment of a method to provide information obscured to a user through a DHR.

FIG. 15 shows flowchart 1500 of a third embodiment of a method to provide information obscured to a user through a display of a hybrid-reality system (DHR). The method starts 1501 by establishing a view position relative to a real-world object 1510 and receiving first dimension and position data 1520 associated with an occluded object. The occluded object is at least partially occluded by the real-world object at the view position. A first image of at least a portion of the occluded object is rendered 1530 on the DHR using the first data.

In some embodiments, a virtual tool is selected 1532. The virtual tool may allow various parameters or measurements of the occlude object to be monitored. The virtual tool can include a visual indicator of the tool, such as, but not limited to, an icon, an image, or text. Examples include a thermometer icon, a stethoscope icon, and an image of an analog voltage meter. The virtual tool may then be associated 1534 with the occluded object. The association may include placing the virtual tool at a first location of the first image. In some embodiments, a second image of at least the portion of the occluded object is rendered along with an image of its associated virtual tool on the DHR.

In some embodiments, a sensor monitoring the occluded object is selected 1536 based on the association of the virtual tool with the occluded object, based on the type of virtual tool selected, or based on the first location of the first image where the virtual tool is placed. The sensor may be physically coupled to the DHR or may be separate from the DHR. The first location may represent a particular location on the occluded object, such as a particular part of the occluded object, a particular object within the occluded object, a test point of the occluded object, or any other interesting feature of the occluded object. In some embodiments, the selected sensor may be activated upon its selection.

Second data associated with the occluded object is received 1540. The second data may represent information about the occluded object, such as a temperature measurement, a voltage, a pressure level, a stress measurement, a noise level, or any other information about the occluded object. The second data may be received from a sensor monitoring the occluded object. In some embodiments, the second data may be received from the selected sensor, but in other embodiments, the second data may be received from an external source, such as a remote computer in communication with the occluded object or a human observing the occluded object. The external source may be selected based on the selection of the virtual tool or on the type of virtual tool. In some embodiments, at least a portion of the second data is stored and the portion of the second data to be stored may be based on a type of the virtual tool.

A stimulus is provided 1550 to the user representing the second data. In some embodiments, the stimulus may be a virtual object presented on the DHR on or near the occluded object. The stimulus may include text displayed on the DHR, a fill amount of the rendered occluded object, a color of at least a portion of the rendered occluded object, a haptic stimulus, or audio content, depending on the embodiment. In some embodiments, the stimulus includes text associated with the virtual tool, a fill amount or a color of the virtual tool, audio content, or a haptic stimulus. The stimulus may be selected based on a location of the virtual tool on the occluded object. In one example embodiment, the virtual tool includes an image of a thermometer, and the second data represents a temperature of the occluded object at a location of the virtual tool on the occluded object.

Figure 16:
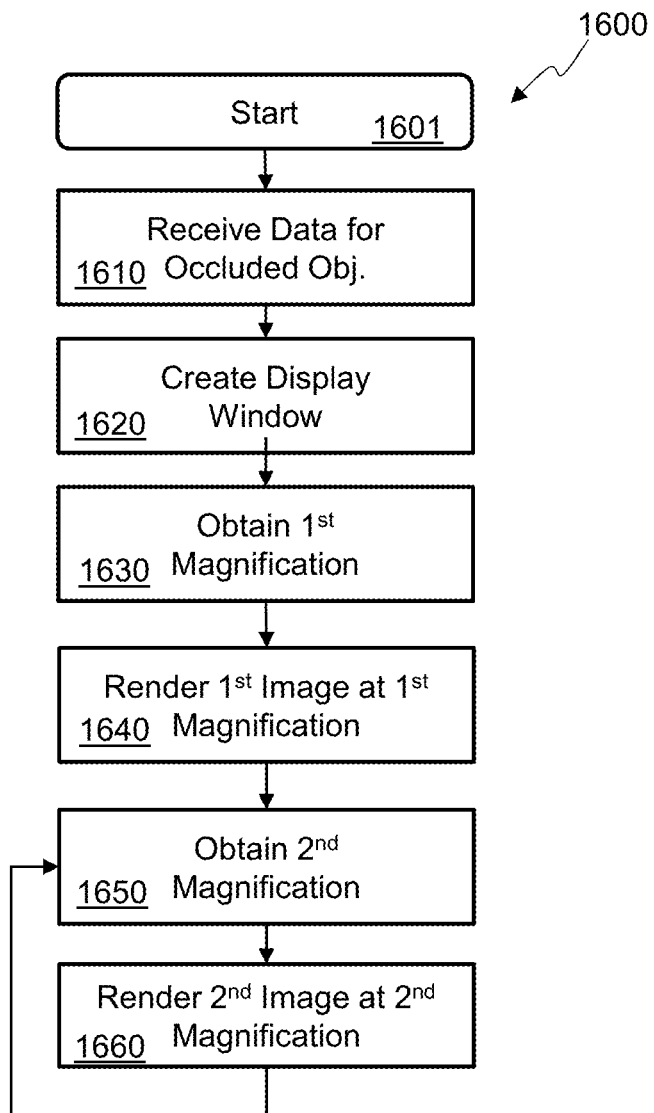
FIG. 16 shows a flowchart of a fourth embodiment of a method provide information obscured to a user through a display of a hybrid-reality system (DHR)

FIG. 16 shows a flowchart 1600 of a fourth embodiment of a method provide information obscured to a user through a display of a hybrid-reality system (DHR). The method starts 1601 by receiving data associated with an occluded object 1610, the occluded object at least partially occluded by a real-world object at a position of the user.

The method continues by creating 1620 a display window on the DHR. One or more parameters, such as a size, a shape, and/or a position, may be received for the display window. The parameters may be received from the user of the DHR, a third party, or may be received from a configuration file of the hybrid-reality system stored locally or remotely. So the display window may be created at a position on the DHR based on the one or more parameters.

A first magnification factor is obtained 1630. The first magnification factor may be obtained in many different ways. In some embodiments the first magnification factor may be set to a default value, such as unity. In at least one embodiment the first magnification factor may be set based on one or more commands received or based on the one or more parameters received for the display window. The method may include creating a view-port having a first size associated with a first portion of the real-world object. The view port may be used to show the occluded object in-situ in an apparent opening on the real-world object that is occluding the occluded object. The first magnification factor may be determined based on at least a first size of the display window and the first size of the view-port, such as by using a ratio of the first size of the display window to the first size of the view-port as the first magnification factor as one non-limiting example. Once the first magnification factor has been determined, a first image of at least the portion of the occluded object is rendered 1640 in the display window at the first magnification factor at a first time.

A second magnification factor, different than the first magnification factor, is obtained 1650 and a second image of at least the portion of the occluded object is rendered 1660 in the display window at the second magnification factor at a second time after the first time. The second magnification factor may be obtained in many different ways. In some embodiments, a command may be received and the second magnification factor determined based, at least in part, on the command. The command may be received from any source, including from the user or from an external source.

In some embodiments, a first virtual distance between the display window and the real-world object is obtained at about the first time and a second virtual distance between the display window and the real-world object is obtained at about the second time. A first real-world distance between the user and the real-world object may be obtained at about the time that the display window is created and the first virtual distance may be determined based on the first real-world distance in some embodiments. The second magnification factor may be calculated based, at least in part, on the first magnification factor, the first virtual distance, and the second virtual distance. Control information related to the display window may be received between the first time and the second time in some embodiments and the second virtual distance determined based on the control information. In some embodiments a user may use gestures, voice commands, or other types of control input to adopt a metaphor of a magnifying glass to change the second magnification factor by moving the display window in and out to change the second magnification factor.

In some embodiments, the view-port may be changed to have a second size and the second magnification factor may be determined based on at least the first size of the display window and the second size of the view-port. Input from an external source or the user may be received to change the first size of the view port to a second size of the view port. The second magnification factor may also be manipulated by changing the display window to have a second size so the second magnification factor may be based on at least the second size of the display window and the first size of the view-port. The sizes of both the display window and view-port may be changed so that the second magnification factor may also be based on both the second size of the display window and the second size of the view-port. In at least one embodiment the second magnification factor may be based on a ratio of the size of the display window to the size of the view-port at the second time.

In some embodiments the view-port may be moved to a second portion of the real-world object that occluded a different portion of the occluded object. A third image of at least a different portion of the occluded object may then be rendered in the display window.

The method of flowchart 1600 may also be used in a hierarchical viewing environment where the real-world object is at least partially occluded from view at the position of the user by another object, and the occluded object is occluded by both the real-world object and the other object. The occluded object may be located within the real-world object or behind the real-world object. In such cases, the display window referred to above may be a second display window showing the occluded object. The second display window on the DHR may be positioned independent of a position of the first display window on the DHR. In at least one embodiment the second display window may be positioned to fully occlude the selected portion of the real-world object in the first window, wherein a shape of the second window corresponds to a shape of the selected portion of the real-world object. An image of the real-world object may be displayed in a first display window on the DHR. A portion of the real-world object that is occluding the portion of the occluded object may be selected in the first display window and may be used to determine what to show in the second display window that is subject to a change in magnification.

Figure 17:
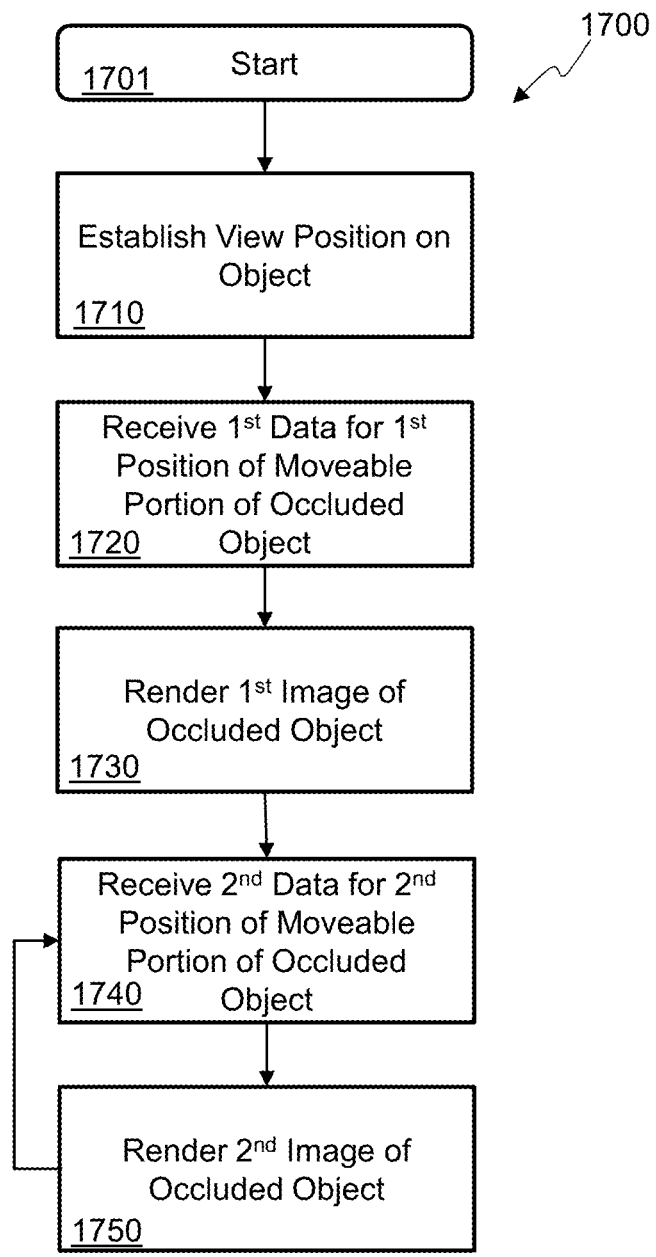
FIG. 17 shows a flowchart of a fifth embodiment of a method provide information obscured to a user through a display of a hybrid-reality system (DHR).

FIG. 17 shows a flowchart 1700 of a fifth embodiment of a method provide information obscured to a user through a display of a hybrid-reality system (DHR). The method starts 1701 by establishing a view position 1710 relative to a real-world object and first data associated with an occluded object is received 1720. The first data provides information about a first position, at a first time, of at least a moveable portion of the occluded object. The occluded object is at least partially occluded from the view position by a surface of the real-world object at the first time. In some cases, the first data may indicate that the moveable portion of the occluded object is occluded from the view position by the surface of the real-world object at the first time, but in other cases, the first data may indicate that the moveable portion of the occluded object is, at least in part, not occluded from the view position by the surface of the real-world object at the first time. A first image of at least the moveable portion of the occluded object in the first position is then rendered 1730 on the display.

Second data associated with the occluded object is received 1740. The second data provides information about a second position, at a second time, of the moveable portion of the occluded object. The occluded object is at least partially occluded from the view position by the surface of the real-world object at the second time. The second data may indicate that the moveable portion of the occluded object is occluded from the view position by the surface of the real-world object at the second time. In some cases, the moveable portion of the occluded object may be occluded by the surface of the real-world staying at both the first time and the second time. In other cases, the moveable portion of the occluded object may move into occlusion or may move out of occlusion between the first time and the second time.

In some embodiments, first sensor data may be received from a sensor included in the occluded object or a separate sensor that monitors the occluded object. The first data may include the first sensor data. The first position of the moveable portion of the occluded object may be determined based on the first sensor data. Second sensor data, included in the second data, may be received from the sensor, and the second position of the moveable portion of the occluded object determined based on the second sensor data.

Sensor data providing information about a third position of a second object may be received in some embodiments.

The second position of the moveable portion of the occluded object may be determined based, at least in part, on the third position of the second object. This may be done where the third position may at least partially alter the position of the occluded object. Non-limiting examples of this are a wrench or screwdriver (second object) turning a nut (portion of the occluded object), an segment of a mechanical arm (second object) which is attached to its base moving a next segment of mechanical arm having (portion of the occluded object), or a first gear (second object) moving an engaged second gear (portion of the occluded object). Depending on the occluded object, the second object may be separate from the occluded object and/or coupled to the occluded object. The second object may, at least in part, move the moveable portion of the occluded object. In some embodiments, the sensor data may be stored, and in at least one embodiment, the second position may be calculated based, at least in part, on previously stored sensor data.

A second image of at least the moveable portion of the occluded object in the second position is then rendered 1750 on the display to replace the first image. Some embodiments may create a window on the display positioned to at least partially occlude the real-world object and render the second image into the window consistent with a real-world position of the second set of occluded objects relative to the view position.

In various embodiments, the occluded object may include a first object and a second object, and the moveable portion of the occluded object may consist of only the second object. In at least one embodiment, third data associated with the occluded object may be received with the third data providing information about a third position, at a third time, of the first object without information related to the second object. The first object may be at least partially occluded from the view position by the surface of the real-world object at the third time. A third image of the first portion of the first object in the third position, without the second object, may then be rendered on the display. The third time may occur at any time with respect to the first time and the second time, and in some cases the third time may occur before the second time. The second object may become occluded by a surface of the real-world object between the third time and the second time.

In some embodiments the moveable portion of the occluded object is under control of a user of the hybrid-reality system. Some embodiments may provide guidance to the user on where to move the moveable portion of the occluded object. This guidance may take any form including, but not limited to, audio messages, textual messages presented on the DHR, or graphical messages presented on the DHR. In some cases the occluded object is associated with a body part of a user of the hybrid-reality system. A non-limiting example of this is a glove (the occluded object) worn on a hand (body part) of a user.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

In at least one embodiment, a computer system renders one or more virtual objects on a display of the computer system which represents occluded or obscured details in the field-of-view. In some embodiments, the virtual rendering covers all or a portion of a real-world object and, if there is motion, displayed in the correct perspective. The information used to render one or more virtual objects may be known, for example blueprints or maps. The information used to render one or more virtual objects may be obtained from external sources, for example drones, mounted sensors or other personnel. The information used to render one or more virtual objects may be obtained from historical data, for example a video stream obtained prior to smoke obscuring the scene.

In at least one embodiment, information obscured to a user is provided through a display of a hybrid-reality system (DHR). A view position relative to a real-world object is established and data associated with an occluded object is received. The occluded object is at least partially occluded by the real-world object at the view position. An image of at least a portion of the occluded object is then rendered on the DHR.

In at least one embodiment, an occluded object displayed through a display of a hybrid-reality system (DHR) is manipulated by establishing a first view position relative to a real-world object and receiving three-dimensional data associated with occluded objects at the first view position. A first image of at least a portion of the occluded objects is rendered on the DHR from the first view position at a geometrically correct location with respect to an image of the real-world object on the HMD using the three-dimensional data. One or more occluded objects are selected from the first image and a second image of the selected objects is rendered on the DHR either in a separate window or as an object in a field of view. The second image can then be manipulated by the user of the hybrid-reality system to obtain more detailed information.

In at least one embodiment, a computer system renders one or more virtual objects on a display of a hybrid-reality system (DHR), such as head-mounted display (HMD), which represents occluded or obscured details in the field-of-view. Information is presented to a user by establishing a view position relative to a real-world object and receiving dimension and position data associated with an occluded object. The occluded object is at least partially occluded by the real-world object at the view position. A first image of at least a portion of the occluded object is rendered on the DHR using the first data. Second data associated with the occluded object is received and a stimulus is provided to the user representing the second data.

In at least one embodiment, information obscured to a user is provided through a display of a hybrid-reality system (DHR). Data associated with an occluded object at least partially occluded by a real-world object at a position of the user is received and a display window is created on the DHR. A first magnification factor is obtained and a first image of at least the portion of the occluded object is rendered in the display window at the first magnification factor at a first time. A second magnification factor, different than the first magnification factor, is obtained, and a second image of at least the portion of the occluded object is rendered in the display window at the second magnification factor at a second time after the first time.

In at least one embodiment, information obscured to a user is provided through a display of a hybrid-reality system (DHR), such as a head-mounted display (HMD). A view position relative to a real-world object is established, the real-world object at least partially occluding a view of an occluded object. First data providing information about a first position, at a first time, of at least a moveable portion of an occluded object is received and a first image of at least the moveable portion of the occluded object in the first position is then rendered on the display. Second data providing information about a second position, at a second time, of the moveable portion of the occluded object is then received, and a second image of at least the moveable portion of the occluded object in the second position is rendered on the display to replace the first image.

Various embodiments are described below. The embodiments described here are not exhaustive of the embodiments disclosed and are non-limiting examples.

Embodiment 1

A method to provide information obscured to a user through a display of a hybrid-reality system (DHR), the method comprising: establishing a view position relative to a real-world object; receiving data associated with an occluded object, the occluded object at least partially occluded by the real-world object at the view position; and rendering an image of at least a portion of the occluded object on the DHR.

Embodiment 2

The method of embodiment 1, further comprising creating a window on the DHR that includes the image and clipping the image to the window.

Embodiment 3

The method of embodiment 2, further comprising: positioning the window to at least partially occlude the real-world object; and rendering the image in a position in the window corresponding to a real-world position of the occluded object.

Embodiment 4

The method of embodiment 3, further comprising positioning the window to fully occlude the real-world object, wherein a shape of the window corresponds to a shape of the real-world object.

Embodiment 5

The method of embodiment 2, further comprising positioning the window independently from a real-world position of the occluded object.

Embodiment 6

The method of embodiment 2, wherein the window is positioned, at least in part, as a view of a space occluded behind a surface of the real-world object.

Embodiment 7

The method of embodiment 2, wherein the window has an asymmetric shape.

Embodiment 8

The method of embodiment 2, wherein the window is a first window, the method further comprising: selecting a subsection of the occluded object in the first window; receiving data associated with a second object occluded by the subsection of the occluded object; and creating a second window on the DHR and rendering a second image of at least a portion of the second object in the second window.

Embodiment 9

The method of embodiment 8, wherein the second object is located within the occluded object.

Embodiment 10

The method of embodiment 8, wherein the second object is located behind the occluded object.

Embodiment 11

The method of embodiment 8, further comprising positioning the second window on the DHR independent of a position of the first window on the DHR.

Embodiment 12

The method of embodiment 8, further comprising positioning the second window to fully occlude the selected subsection of the occluded object in the first window, wherein a shape of the second window corresponds to a shape of the selected subsection of the occluded object.

Embodiment 13

The method of embodiment 1, further comprising rendering the image of at least the portion of the occluded object with a perspective based on a user position with respect to the real-world object.

Embodiment 14

The method of embodiment 1, further comprising rendering the image of at least the portion of the occluded object with a perspective based on viewing parameters stored within the hybrid-reality system.

Embodiment 15

The method of embodiment 1, further comprising receiving the view position from an entity that is not the user.

Embodiment 16

The method of embodiment 1, further comprising: determining a real-world position of the DHR; and establishing the view position based on the real-world position of the DHR.

Embodiment 17

The method of embodiment 16, further comprising: creating a window on the DHR that includes the image, the window positioned, at least in part, as a cut-away view of an occluded space behind a surface of the real-world object; determining the portion of the occluded object to render and a perspective of the occluded object based on relative positions of the view position, the window, the real-world object, and the occluded object; establishing a new view position based on a new real-world position of the DHR; determining a new portion of the occluded object to render and a new perspective of the occluded object based on relative positions of the new view position, the window, the real-world object, and the occluded object; and rendering a new image of at least the new portion of the occluded object in the window on the DHR to replace the image of at least the portion of the occluded object on the DHR.

Embodiment 18

The method of embodiment 16, further comprising: creating a window on the DHR that includes the image, the window positioned, at least in part, as a cut-away view of an occluded space behind a surface of the real-world object; determining the portion of the occluded object to render and a perspective of the occluded object based on relative positions of the view position, the window, the real-world object, and the occluded object; moving the window to a new position on the DHR; determining a new portion of the occluded object to render and a new perspective of the occluded object based on relative positions of the view position, the new position of the window, the real-world object, and the occluded object; and rendering a new image of at least the new portion of the occluded object in the window on the DHR to replace the image of at least the portion of the occluded object on the DHR.

Embodiment 19

The method of embodiment 1, further comprising determining a characteristic of the real-world object, wherein the data associated with the occluded object is based on the characteristic of the real-world object.

Embodiment 20

The method of embodiment 1, wherein the data associated with the occluded object comprises information related to the real-world object.

Embodiment 21

The method of embodiment 20, wherein the data associated with the occluded object comprises a schematic, plan, blueprint, or map of the real-world object.

Embodiment 22

The method of embodiment 1, wherein the received data associated with the occluded object is based on data from one or more sensors.

Embodiment 23

The method of embodiment 1, wherein the received data associated with the occluded object was established at an earlier time.

Embodiment 24

The method of embodiment 23, wherein the received data associated with the occluded object was collected during a visit at an earlier time to an area near the occluded object by one or more people using hybrid-reality systems with integrated sensors.

Embodiment 25

An article of manufacture comprising a tangible medium, that is not a transitory propagating signal, encoding computer-readable instructions that, when applied to a computer system, instruct the computer system to perform a method comprising: establishing a view position relative to a real-world object; receiving data associated with an occluded object, the occluded object at least partially occluded by the real-world object at the view position; and rendering an image of at least a portion of the occluded object on the DHR.

Embodiment 26

A hybrid-reality system comprising: a display; a structure, coupled to the display and adapted to position the display in a field-of-view (FOV) of the user; and a processor, coupled to the display, the processor configured to: establish a view position relative to a real-world object; receive data associated with an occluded object, the occluded object at least partially occluded by the real-world object at the view position; and render an image of at least a portion of the occluded object on the display.

Embodiment 27

A method to virtually manipulate an occluded object shown through a display of a hybrid-reality system (DHR), the method comprising: establishing a first view position including a first view location and a first direction of view relative to a real-world object; receiving position data associated with one or more occluded objects, the one or more occluded objects at least partially occluded by the real-world object at the first view position; rendering a first image of at least a portion of the one or more occluded objects on the HMD at the first view position, the portion of the one or more occluded objects rendered at a geometrically correct location with respect to an image of the real-world object on the DHR using the received position data; selecting at least one occluded object from the portion of the one or more occluded objects rendered in the first image; establishing a second view position including a second location and a second direction of view relative to the at least one selected occluded object; and rendering a second image of the at least one selected occluded object on the DHR from the second view position using the received position data.

Embodiment 28

The method of embodiment 27, said selecting comprising: manipulating a size and/or position of a view-port on the image of the real-world object, wherein the first image is clipped to the view-port; and selecting the at least one occluded object based on what is visible in the view-port.

Embodiment 29

The method of embodiment 28, the manipulating comprising: detecting a gesture of the user using a sensor coupled to the hybrid-reality system; and manipulating a size and/or position of a view-port based on the gesture.

Embodiment 30

The method of embodiment 27, said selecting comprising receiving one or more command s from a user of the hybrid-reality system to select the at least one occluded object, wherein the at least one occluded object includes a first occluded object of the one or more occluded objects rendered in the first image and excludes a second occluded object of the one or more occluded objects rendered in the first image.

Embodiment 31

The method of embodiment 30, the receiving command s comprising: detecting a gesture of the user using a sensor coupled to the hybrid-reality system; and determining the one or more command s based on the gesture.

Embodiment 32

The method of embodiment 27, further comprising rendering the second image at a position on the DHR independent of a position of an image of the real-world object on the DHR.

Embodiment 33

The method of embodiment 32, wherein the second image is displayed in a window on the DHR.

Embodiment 34

The method of embodiment 32, wherein the at least one selected occluded object is displayed on the DHR as an object in a field of view.

Embodiment 35

The method of embodiment 27, further comprising presenting the first image and the second image on the DHR simultaneously.

Embodiment 36

The method of embodiment 27, further comprising detecting a change of location of the DHR to establish the second view position.

Embodiment 37

The method of embodiment 27, further comprising receiving input from the user of the hybrid-reality system to establish the second view position.

Embodiment 38

The method of embodiment 37, the receiving input comprising: detecting a gesture of the user using a sensor coupled to the hybrid-reality system; and determining the input based on the gesture.

Embodiment 39

The method of embodiment 27, further comprising: receiving input from a user of the hybrid-reality system over a period of time to establish subsequent view positions; and generating subsequent images of the at least one selected occluded object on the DHR from the subsequent view positions in near real-time to create an interactive display on the DHR.

Embodiment 40

The method of embodiment 39, the receiving input comprising: detecting gestures of the user using a sensor coupled to the hybrid reality system; and determining the input based on the gestures.

Embodiment 41

The method of embodiment 39, the receiving input comprising determining locations of the DHR over the period of time using sensors included in the DHR.

Embodiment 42

The method of embodiment 27, further comprising: determining a first location and a first orientation of the DHR using sensors in the DHR at a first time; establishing the first view position based on the first location and the first orientation of the DHR; establishing a virtual position with respect to the first view location for a virtual presentation of the at least one selected objects; determining a second location and a second orientation of the DHR using the sensors in the DHR at a second time; establishing the second view position based on the second location and the second orientation of the DHR; and rendering the at least one selected object from the second view position at the virtual position in the second image.

Embodiment 43

The method of embodiment 42, wherein the DHR comprises a head-mounted display (HMD).

Embodiment 44

The method of embodiment 42, further comprising: determining subsequent locations and subsequent orientations of the DHR using sensors in the DHR over a period of time to establish subsequent view positions; and generating subsequent images of the at least one selected occluded object on the DHR from the subsequent view positions at the virtual position in near real-time to create an interactive display on the DHR.

Embodiment 45

An article of manufacture comprising a tangible medium, that is not a transitory propagating signal, encoding computer-readable instructions that, when applied to a computer system, instruct the computer system to perform a method comprising: establishing a first view position including a first view location and a first direction of view relative to a real-world object; receiving position data associated with one or more occluded objects, the one or more occluded objects at least partially occluded by the real-world object at the first view position; rendering a first image of at least a portion of the one or more occluded objects on the HMD at the first view position, the portion of the one or more occluded objects rendered at a geometrically correct location with respect to an image of the real-world object on the DHR using the received position data; selecting at least one occluded object from the portion of the the one or more occluded objects rendered in the first image; establishing a second view position including a second location and a second direction of view relative to the at least one selected occluded object; and rendering a second image of the at least one selected occluded object on the DHR from the second view position using the received position data.

Embodiment 46

A hybrid-reality system comprising: a display; a structure, coupled to the display and adapted to position the display in a field-of-view (FOV) of the user; a processor, coupled to the display, the processor configured to: establish a first view position including a first view location and a first direction of view relative to a real-world object; receive position data associated with one or more occluded objects, the one or more occluded objects at least partially occluded by the real-world object at the first view position; render a first image of at least a portion of the one or more occluded objects on the HMD at the first view position, the portion of the one or more occluded objects rendered at a geometrically correct location with respect to an image of the real-world object on the DHR using the received position data; select at least one occluded object from the portion of the the one or more occluded objects rendered in the first image; establish a second view position including a second location and a second direction of view relative to the at least one selected occluded object; and render a second image of the at least one selected occluded object on the DHR from the second view position using the received position data.

Embodiment 47

A method to provide information obscured to a user through a display associated with a hybrid-reality system (DHR), the method comprising: establishing a view position relative to a real-world object; receiving first dimension and position data associated with an occluded object, the occluded object at least partially occluded by the real-world object at the view position; rendering a first image of at least a portion of the occluded object on the DHR using the first data; receiving second data associated with the occluded object; and providing a stimulus to the user representing the second data.

Embodiment 48

The method of embodiment 47, wherein the stimulus comprises a virtual object presented on the DHR on or near the occluded object

Embodiment 49

The method of embodiment 47, the stimulus comprising text displayed on the DHR, a fill amount of the rendered occluded object, a color of at least a portion of the rendered occluded object, a haptic stimulus, or audio content or any combination thereof.

Embodiment 50

The method of embodiment 47, further comprising receiving the second data from a sensor monitoring the occluded object.

Embodiment 51

The method of embodiment 50, wherein the sensor is physically coupled to the occluded object.

Embodiment 52

The method of embodiment 47, further comprising: selecting a virtual tool; associating the virtual tool with the occluded object; and rendering a second image of at least the portion of the occluded object with its associated virtual tool on the DHR.

Embodiment 53

The method of embodiment 52, the stimulus comprising text associated with the virtual tool.

Embodiment 54

The method of embodiment 52, the stimulus comprising a fill amount or a color of the virtual tool.

Embodiment 55

The method of embodiment 52, wherein the virtual tool comprises an image of a thermometer, and the second data represents a temperature of the occluded object at a location of the virtual tool on the occluded object.

Embodiment 56

The method of embodiment 52, the stimulus comprising audio content or a haptic stimulus selected based on a location of the virtual tool on the occluded object.

Embodiment 57

The method of embodiment 52, further comprising: selecting a sensor monitoring the occluded object based on the association of the virtual tool with the occluded object; and receiving the second data from the selected sensor.

Embodiment 58

The method of embodiment 57, further comprising activating the selected sensor.

Embodiment 59

The method of embodiment 52, further comprising: placing the virtual tool at a first location of the first image; selecting a sensor monitoring the occluded object based on the first location; and receiving the second data from the selected sensor.

Embodiment 60

The method of embodiment 59, further comprising activating the selected sensor.

Embodiment 61

The method of embodiment 52, further comprising: selecting an external data source based on the selection of the virtual tool; and receiving the second data from the selected external data source.

Embodiment 62

The method of embodiment 61, the selecting of the external data source is based, at least in part, on a type of the virtual tool.

Embodiment 63

The method of embodiment 47, further comprising storing at least a portion of the second data.

Embodiment 64

The method of embodiment 63, further comprising determining the portion of the second data to be stored based on a type of the virtual tool.

Embodiment 65

An article of manufacture comprising a tangible medium, that is not a transitory propagating signal, encoding computer-readable instructions that, when applied to a computer system, instruct the computer system to perform a method comprising: establishing a view position relative to a real-world object; receiving first dimension and position data associated with an occluded object, the occluded object at least partially occluded by the real-world object at the view position; rendering a first image of at least a portion of the occluded object on the DHR using the first data; receiving second data associated with the occluded object; and providing a stimulus to the user representing the second data.

Embodiment 66

A hybrid-reality system comprising: a display; a structure, coupled to the display and adapted to position the display in a field-of-view (FOV) of the user; a processor, coupled to the display, the processor configured to: establish a view position relative to a real-world object; receive first dimension and position data associated with an occluded object, the occluded object at least partially occluded by the real-world object at the view position; render a first image of at least a portion of the occluded object on the DHR using the first data; receive second data associated with the occluded object; and provide a stimulus to the user representing the second data.

Embodiment 67

A method to provide information obscured to a user through a display of a hybrid reality system (DHR), the method comprising: receiving data associated with an occluded object, the occluded object at least partially occluded by a real-world object at a position of the user; creating a display window on the DHR; obtaining a first magnification factor; rendering a first image of at least the portion of the occluded object in the display window at the first magnification factor at a first time; obtaining a second magnification factor, different than the first magnification factor; and rendering a second image of at least the portion of the occluded object in the display window at the second magnification factor at a second time after the first time.

Embodiment 68

The method of embodiment 67, further comprising: receiving a command; determining the second magnification factor based, at least in part, on the command.

Embodiment 69

The method of embodiment 68, wherein the command is received from the user.

Embodiment 70

The method of embodiment 68, wherein the command is received from an external source.

Embodiment 71

The method of embodiment 67, further comprising: obtaining a first virtual distance between the display window and the real-world object at about the first time; obtaining a second virtual distance between the display window and the real-world object at about the second time; and calculating the second magnification factor based, at least in part, on the first magnification factor, the first virtual distance, and the second virtual distance.

Embodiment 72

The method of embodiment 71, further comprising: obtaining a first real-world distance between the user and the real-world object at about the time that the display window is created; and determining the first virtual distance based on the first real-world distance.

Embodiment 73

The method of embodiment 71, further comprising: receiving control information related to the display window between the first time and the second time; and determining the second virtual distance based on the control information.

Embodiment 74

The method of embodiment 67, further comprising: receiving one or more parameters for the display window; determining the first magnification factor based on the one or more parameters; and creating the display window at a position on the DHR based on the one or more parameters.

Embodiment 75

The method of embodiment 67, further comprising: creating a view-port associated with a first portion of the real-world object, the view-port having a first size; determining the first magnification factor based on at least a first size of the display window and the first size of the view-port.

Embodiment 76

The method of embodiment 75, further comprising receiving input from an external source to change the first size of the view port to a second size of the view port.

Embodiment 77

The method of embodiment 75, further comprising: changing the view-port to have a second size; determining the second magnification factor based on at least the first size of the display window and the second size of the view-port.

Embodiment 78

The method of embodiment 75, further comprising: changing the display window to have a second size; determining the second magnification factor based on at least the second size of the display window and the first size of the view-port.

Embodiment 79

The method of embodiment 75, further comprising: moving the view-port to a second portion of the real-world object; rendering a third image of at least a different portion of the occluded object in the display window, the different portion of the occluded object occluded by the second portion of the real-world object.

Embodiment 80

The method of embodiment 67, wherein the display window is a second display window, the method further comprising: displaying an image of the real-world object in a first display window on the DHR, the real-world object at least partially occluded from view at the position of the user; and selecting a portion of the real-world object in the first display window that is occluding the portion of the occluded object.

Embodiment 81

The method of embodiment 80, wherein the occluded object is located within the real-world object.

Embodiment 82

The method of embodiment 80, wherein the occluded object is located behind the real-world object.

Embodiment 83

The method of embodiment 80, further comprising positioning the second display window on the DHR independent of a position of the first display window on the DHR.

Embodiment 84

The method of embodiment 80, further comprising positioning the second display window to fully occlude the selected portion of the real-world object in the first window, wherein a shape of the second window corresponds to a shape of the selected portion of the real-world object.

Embodiment 85

An article of manufacture comprising a tangible medium, that is not a transitory propagating signal, encoding computer-readable instructions that, when applied to a computer system, instruct the computer system to perform a method comprising: receiving data associated with an occluded object, the occluded object at least partially occluded by a real-world object at a position of the user; creating a display window on a display of a hybrid reality system (DHR); obtaining a first magnification factor; rendering a first image of at least the portion of the occluded object in the display window at the first magnification factor at a first time; obtaining a second magnification factor, different than the first magnification factor; and rendering a second image of at least the portion of the occluded object in the display window at the second magnification factor at a second time after the first time.

Embodiment 86

A hybrid reality system comprising: a display; a structure, coupled to the display and adapted to position the display in a field-of-view (FOV) of the user; a processor, coupled to the display, the processor configured to: receive data associated with an occluded object, the occluded object at least partially occluded by a real-world object at a position of the user; create a display window on the display; obtain a first magnification factor; render a first image of at least the portion of the occluded object in the display window at the first magnification factor at a first time; obtain a second magnification factor, different than the first magnification factor; and render a second image of at least the portion of the occluded object in the display window at the second magnification factor at a second time after the first time.

Embodiment 87

A method to provide information obscured to a user through a display of a hybrid-reality system (DHR), the method comprising: establishing a view position relative to a real-world object; receiving first data associated with an occluded object, the first data providing information about a first position, at a first time, of at least a moveable portion of the occluded object, the occluded object at least partially occluded from the view position by a surface of the real-world object at the first time; rendering a first image of at least the moveable portion of the occluded object in the first position on the display; receiving second data associated with the occluded object, the second data providing information about a second position, at a second time, of the moveable portion of the occluded object, the occluded object at least partially occluded from the view position by the surface of the real-world object at the second time; and rendering a second image of at least the moveable portion of the occluded object in the second position on the display to replace the first image.

Embodiment 88

The method of embodiment 87, wherein: the first data indicates that the moveable portion of the occluded object is occluded from the view position by the surface of the real world object at the first time; and the second data indicates that the moveable portion of the occluded object is occluded from the view position by the surface of the real world object at the second time.

Embodiment 89

The method of embodiment 87, wherein: the first data indicates that the moveable portion of the occluded object is, at least in part, not occluded from the view position by the surface of the real world object at the first time; and the second data indicates that the moveable portion of the occluded object is occluded from the view position by the surface of the real world object at the second time.

Embodiment 90

The method of embodiment 87, the occluded object comprising a first object and a second object, and the moveable portion of the occluded object consisting of the second object.

Embodiment 91

The method of embodiment 90, further comprising: receiving third data associated with the occluded object, the third data providing information about a third position, at a third time, of the first object without information related to the second object, the first object at least partially occluded from the view position by the surface of the real-world object at the third time; and rendering a third image of the first portion of the first object in the third position, without the second object, on the display.

Embodiment 92

The method of embodiment 91, wherein the third time occurs before the second time; and the second object becomes occluded by a surface of the real-world object between the third time and the second time.

Embodiment 93

The method of embodiment 87, further comprising: creating a window on the display positioned to at least partially occlude the real-world object; and rendering the second image into the window consistent with a real-world position of the second set of occluded objects relative to the view position.

Embodiment 94

The method of embodiment 87, further comprising: receiving first sensor data from a sensor included in the occluded object, the first data comprising the first sensor data; determining the first position of the moveable portion of the occluded object based on the first sensor data; receiving second sensor data from the sensor, the second data comprising the second sensor data; and determining the second position of the moveable portion of the occluded object based on the second sensor data.

Embodiment 95

The method of embodiment 87, further comprising: receiving first sensor data from a sensor separate from the occluded object, the first data comprising the first sensor data; determining the first position of the moveable portion of the occluded object based on the first sensor data; receiving second sensor data from the sensor, the second data comprising the second sensor data; and determining the second position of the moveable portion of the occluded object based on the second sensor data.

Embodiment 96

The method of embodiment 87, wherein the moveable portion of the occluded object is under control of a user of the hybrid-reality system.

Embodiment 97

The method of embodiment 96, further comprising providing guidance to the user on where to move the moveable portion of the occluded object.

Embodiment 98

The method of embodiment 87, wherein the occluded object is associated with a body part of a user of the hybrid-reality system.

Embodiment 99

The method of embodiment 87, further comprising: receiving sensor data from a sensor, the sensor data providing information about a third position of a second object; and determining the second position of the moveable portion of the occluded object based, at least in part, on the third position of the second object.

Embodiment 100

The method of embodiment 99, wherein the second object is separate from the occluded object.

Embodiment 101

The method of embodiment 99, wherein the second object is coupled to the occluded object.

Embodiment 102

The method of embodiment 100, wherein the second object, at least in part, moves the moveable portion of the occluded object.

Embodiment 103

The method of embodiment 99, further comprising: storing the sensor data; and computing the second position based, at least in part, on previously stored sensor data.

Embodiment 104

An article of manufacture comprising a tangible medium, that is not a transitory propagating signal, encoding computer-readable instructions that, when applied to a computer system, instruct the computer system to perform a method comprising: establishing a view position relative to a real-world object; receiving first data associated with an occluded object, the first data providing information about a first position, at a first time, of at least a moveable portion of the occluded object, the occluded object at least partially occluded from the view position by a surface of the real-world object at the first time; rendering a first image of at least the moveable portion of the occluded object in the first position on the display; receiving second data associated with the occluded object, the second data providing information about a second position, at a second time, of the moveable portion of the occluded object, the occluded object at least partially occluded from the view position by the surface of the real-world object at the second time; and rendering a second image of at least the moveable portion of the occluded object in the second position on the display to replace the first image.

Embodiment 105

A hybrid-reality system comprising: a display; a structure, coupled to the display and adapted to position the display in a field-of-view (FOV) of the user; and a processor, coupled to the display, the processor configured to: establish a view position relative to a real-world object; receive first data associated with an occluded object, the first data providing information about a first position, at a first time, of at least a moveable portion of the occluded object, the occluded object at least partially occluded from the view position by a surface of the real-world object at the first time; render a first image of at least the moveable portion of the occluded object in the first position on the display; receive second data associated with the occluded object, the second data providing information about a second position, at a second time, of the moveable portion of the occluded object, the occluded object at least partially occluded from the view position by the surface of the real-world object at the second time; and render a second image of at least the moveable portion of the occluded object in the second position on the display to replace the first image.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, π, 3.3̄3̄, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method to provide information obscured to a user through a display of a hybrid reality system (DHR), the method comprising:
receiving data associated with an occluded object at the hybrid-reality system from a separate device over a computer network, the occluded object at least partially occluded by a first real-world object at a position of the DHR, the occluded object including a hidden portion that is hidden from the position of the DHR by the first real-world object, wherein the occluded object is a second real-world object or a part of the first real-world object;
establishing a virtual window having a first arrangement overlaid on a view of the first real-world object visible on the DHR, wherein the first arrangement comprises a first size, a first shape, and a first location of the virtual window on the first real-world object;
determining a relative position of the DHR to the occluded object and the first arrangement of the virtual window on the first real-world object;
creating a display window on the DHR having a size that is smaller than the DHR and does not overlap the virtual window;
rendering a first image using the received data, the first image showing a first virtual view of the hidden portion of the occluded object as it would be seen from the position of the DHR through the virtual window based on the relative position of the DHR to the occluded object and the first arrangement of the virtual window on the first real-world object;
scaling the first image based on the size of the display window; and presenting the scaled first image in the display window on the DHR.

2. The method of claim 1, further comprising:
receiving a command;
changing the virtual window to have a second arrangement on the first real-world object based, at least in part, on the command;
rendering a second image using the received data, the second image showing a second virtual view of the hidden portion of the occluded object as it would be seen from the point-of-view of the DHR through the changed virtual window;
scaling the second image to the size of the display window; and
presenting the scaled second image in the display window on the DHR.

3. The method of claim 2, wherein the command is received from the user.

4. The method of claim 2, wherein the command is received at the hybrid reality system over the computer network from an external source.

5. The method of claim 1, wherein the occluded object is located within the first real-world object.

6. The method of claim 1, wherein the occluded object is located behind the first real-world object.

7. The method of claim 1, further comprising displaying the first image in the virtual window on the DHR simultaneously with the presenting of the scaled first image in the display window.

8. The method of claim 1, wherein the relative position of the DHR to the first real-world object is determined using a sensor of the DHR, and the relative position between the DHR and the occluded object is determined based on the received data associated with the occluded object.

9. The method of claim 1, further comprising:
detecting a change in the relative position of the DHR to the virtual window on the first real-world object or the occluded object;
creating a second image using the received data, the second image showing a second virtual view of the hidden portion of the occluded object as it would be seen from the point-of-view of the DHR through the virtual window based on the changed relative position of the DHR to the virtual window on the first real-world object or the occluded object;
scaling the second image based on the size of the display window; and
presenting the scaled second image in the display window on the DHR in place of the scaled first image.

10. The method of claim 9, wherein the change in the relative position of the DHR to the virtual window on the first real-world object or the occluded object is determined by using a sensor of the DHR to detect a change in the relative position of the DHR to the first real-world object.

11. The method of claim 9, wherein the change in the relative position of the DHR to the occluded object is determined by using the data received from the separate device.

12. The method of claim 2, wherein the second arrangement of the virtual window comprises a second size that is smaller than in the first arrangement of the virtual window, and the second image shows less of the hidden portion of the occluded object than the first image scaled but scaled to a larger size than in the first image.

13. An article of manufacture comprising a tangible medium, that is not a transitory propagating signal, encoding computer-readable instructions that, when applied to a computer system coupled to a display of a hybrid reality system (DHR), instruct the computer system to perform a method comprising:
receiving data associated with an occluded object at the hybrid-reality system from a separate device over a computer network, the occluded object at least partially occluded by a first real-world object at a position of the DHR, the occluded object including a hidden portion that is hidden from the position of the DHR by the first real-world object, wherein the occluded object is a second real-world object or a part of the first real-world object;
establishing a virtual window having a first arrangement overlaid on a view of the first real-world object visible on the DHR, wherein the first arrangement comprises a first size, a first shape, and a first location of the virtual window on the first real-world object;
determining a relative position of the DHR to the occluded object and the first arrangement of the virtual window on the first real-world object;
creating a display window on the DHR having a size that is smaller than the DHR and does not overlap the virtual window;
rendering a first image using the received data, the first image showing a first virtual view of the hidden portion of the occluded object as it would be seen from the position of the DHR through the virtual window based on the relative position of the DHR to the occluded object and the first arrangement of the virtual window on the first real-world object;
scaling the first image based on the size of the display window; and
presenting the scaled first image in the display window on the DHR.

14. The article of manufacture of claim 13, the method further comprising:
detecting a change in the relative position of the DHR to the virtual window on the first real-world object or the occluded object;
creating a second image using the received data, the second image showing a second virtual view of the hidden portion of the occluded object as it would be seen from the point-of-view of the DHR through the virtual window based on the changed relative position of the DHR to the virtual window on the first real-world object or the occluded object;
scaling the second image based on the size of the display window; and
presenting the scaled second image in the display window on the DHR in place of the scaled first image.

15. The article of manufacture of claim 13, the method further comprising:
receiving a command;
changing the virtual window to have a second arrangement on the first real-world object based, at least in part, on the command;
rendering a second image using the received data, the second image showing a second virtual view of the hidden portion of the occluded object as it would be seen from the point-of-view of the DHR through the changed virtual window;
scaling the second image to the size of the display window; and
presenting the scaled second image in the display window on the DHR.

16. A hybrid reality system comprising:
a display;

a sensor;

a structure, coupled to the display and the sensor, and adapted to position the display in a field-of-view (FOV) of the user;

a computer network interface; and a processor, coupled to the display, the sensor, and the computer network interface, the processor configured to:

receive data associated with an occluded object from a separate device through the computer network interface, the occluded object at least partially occluded by a first real-world object at a position of the display, the occluded object including a hidden portion that is hidden from the position of the display by the first real-world object, wherein the occluded object is a second real-world object or a part of the first real-world object;

establish a virtual window having a first arrangement overlaid on a view of the first real-world object visible on the display, wherein the first arrangement comprises a first size, a first shape, and a first location of the virtual window on the first real-world object;

determine a relative position of the display to the occluded object and the first arrangement of the virtual window on the first real-world object;

create a display window on the display having a size that is smaller than the display and does not overlap the virtual window;

render a first image using the received data, the first image showing a first virtual view of the hidden portion of the occluded object as it would be seen from the position of the display through the virtual window based on the relative position of the display to the occluded object and the first arrangement of the virtual window on the first real-world object;

scaling the first image based on the size of the display window; and present the scaled first image in the display window on the display.

17. The system of claim 16, the processor further configured to display the first image in the virtual window on the display simultaneously with the presenting of the scaled first image in the display window.

18. The system of claim 16, wherein the relative position of the display to the first real-world object is determined using the sensor, and the relative position between the display and the occluded object is determined based on the received data associated with the occluded object.

19. The system of claim 16, the processor further configured to:

detect a change in the relative position of the display to the virtual window on the first real-world object or the occluded object by using the sensor to detect a change in the relative position of the display to the first real-world object;

create a second image using the received data, the second image showing a second virtual view of the hidden portion of the occluded object as it would be seen from the point-of-view of the display through the virtual window based on the changed relative position of the display to the virtual window on the first real-world object or the occluded object;

scale the second image based on the size of the display window; and present the scaled second image in the display window on the display in place of the scaled first image.

20. The system of claim 16, the processor further configured to:

receive a command;

change the virtual window to have a second arrangement on the first real-world object based, at least in part, on the command;

render a second image using the received data, the second image showing a second virtual view of the hidden portion of the occluded object as it would be seen from the point-of-view of the display through the changed virtual window;

scale the second image to the size of the display window; and present the scaled second image in the display window on the display.

* * * * *